United States Patent
Kurota et al.

(10) Patent No.: US 10,989,993 B2
(45) Date of Patent: Apr. 27, 2021

(54) CONTROL DEVICE FOR CORRECTING PROJECTION IMAGE, PROJECTION SYSTEM, METHOD OF CONTROLLING SAME, AND STORAGE MEDIUM

(71) Applicant: CANON KABUSHIKI KAISHA, Tokyo (JP)

(72) Inventors: Masaru Kurota, Tokyo (JP); Kensuke Inagaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/247,888

(22) Filed: Jan. 15, 2019

(65) Prior Publication Data
US 2019/0219907 A1   Jul. 18, 2019

(30) Foreign Application Priority Data
Jan. 18, 2018   (JP) .............................. JP2018-006087

(51) Int. Cl.
*G03B 21/14* (2006.01)
*G06F 3/041* (2006.01)
(Continued)

(52) U.S. Cl.
CPC ......... *G03B 21/147* (2013.01); *G06F 3/0412* (2013.01); *G06F 3/0416* (2013.01); *G06F 3/0484* (2013.01); *G06F 3/04845* (2013.01); *G06F 3/04883* (2013.01); *H04N 9/3185* (2013.01)

(58) Field of Classification Search
CPC .... G06F 3/04847; H04N 9/3185; G06T 3/005
See application file for complete search history.

(56) References Cited

U.S. PATENT DOCUMENTS

| 8,351,983 | B2 * | 1/2013 | Kim ..................... | H04N 9/3173 |
| | | | | 455/556.1 |
| 2003/0189675 | A1 * | 10/2003 | Itaki ..................... | H04N 3/2335 |
| | | | | 348/745 |

(Continued)

FOREIGN PATENT DOCUMENTS

| JP | 2009251542 A | 10/2009 |
| JP | 2010197843 A | 9/2010 |

(Continued)

*Primary Examiner* — Kevin M Nguyen
(74) *Attorney, Agent, or Firm* — Rossi, Kimms & McDowell LLP

(57) ABSTRACT

A control device for controlling a shape of a projection image projected by a projector. The control device communicates with the projector. A correction target point of the projection image is selected, and an image including an image indicative of the selected correction target point and a first pattern associated with the correction target point is displayed on a display section. A user's operation for moving the target point of the projection image is received. According to selection of the target point of the projection image, a first instruction for projecting a second pattern corresponding to the first pattern is transmitted to the projector, and a second instruction for moving the target point of the projection image according to the received user's operation is transmitted to the projector.

14 Claims, 16 Drawing Sheets

(51) Int. Cl.
    *G06F 3/0484*     (2013.01)
    *G06F 3/0488*     (2013.01)
    *H04N 9/31*     (2006.01)

(56) References Cited

U.S. PATENT DOCUMENTS

| | | | |
|---|---|---|---|
| 2014/0098124 A1* | 4/2014 | Yoshimura | H04N 9/3185 345/619 |
| 2016/0188195 A1* | 6/2016 | Chen | H04N 9/3185 715/765 |
| 2016/0334911 A1* | 11/2016 | Kimura | G06F 3/0412 |

FOREIGN PATENT DOCUMENTS

| | | |
|---|---|---|
| JP | 2010278806 A | 12/2010 |
| JP | 2015154173 A | 8/2015 |

* cited by examiner

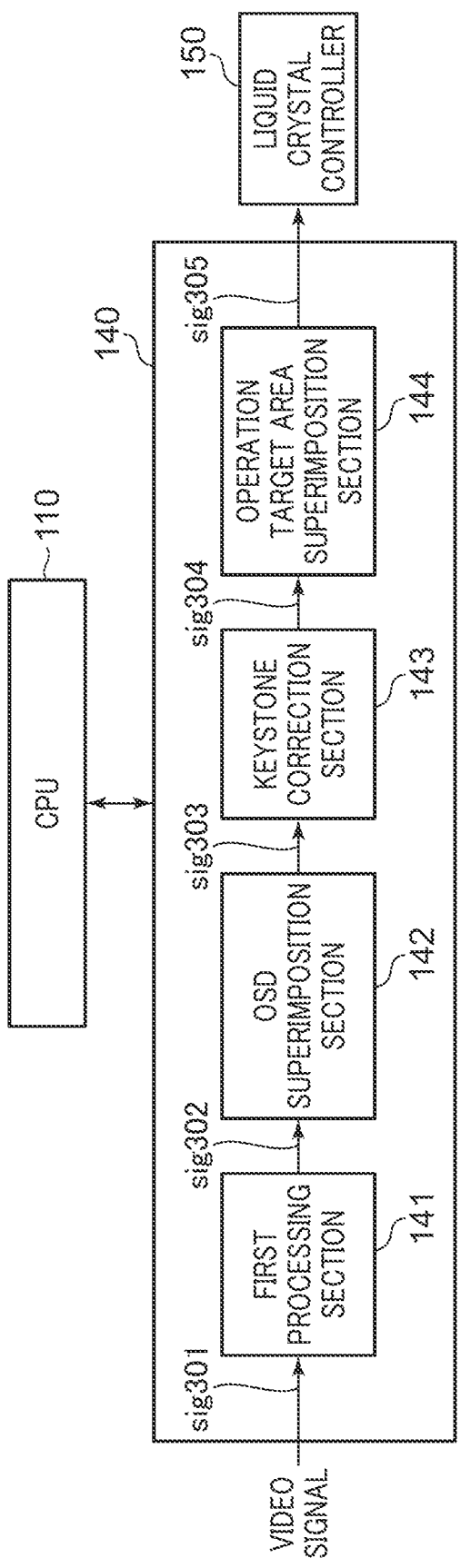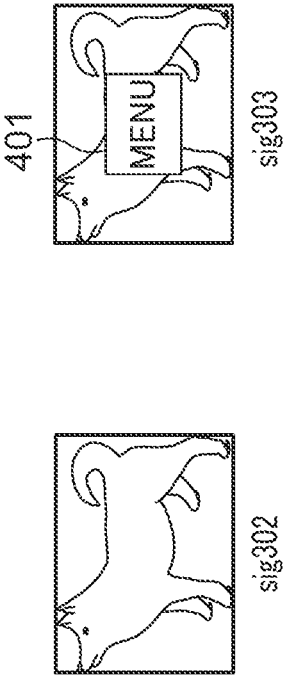

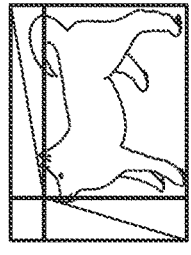
FIG. 11A
sig302
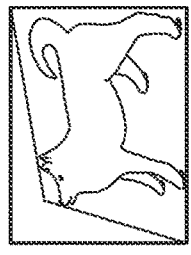
FIG. 11B
sig303
FIG. 11C
sig304
FIG. 11D EXPRESSION BY MOVING DIRECTION GUIDE SUPERIMPOSITION SECTION
sig305
FIG. 11E
sig302
FIG. 11F EXPRESSION BY OSD SUPERIMPOSITION SECTION
sig303
802
801
FIG. 11G
sig304
802
801
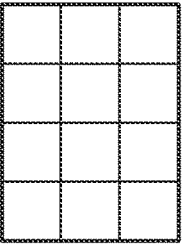
FIG. 11H
TEST PATTERN

USER'S OPERATION

PROJECTION PLANE

CONTROL DEVICE FOR CORRECTING PROJECTION IMAGE, PROJECTION SYSTEM, METHOD OF CONTROLLING SAME, AND STORAGE MEDIUM

BACKGROUND OF THE INVENTION

Field of the Invention

The present invention relates to a control device for correcting a projection image, a projection system, a method of controlling the same, and a storage medium, and more particularly to a control device that generates a parameter for use in image processing performed by a projection apparatus, such as a liquid crystal projector, a projection system including the control device, a method of controlling the same, and a storage medium.

Description of the Related Art

In recent years, a projection apparatus (hereinafter simply referred to as the projector), such as a liquid crystal projector, is widely used not only for business use, such as use for presentation and use in a meeting, but also for home use, such as a home theater. The projector is used in various places, and cannot be necessarily placed in front of a screen because of restrictions on a place. In a case where the projector is used in such a place having restrictions, projection is often performed from the projector which is placed on a desk such that the projector is tilted toward a screen located slightly above the projector.

However, in the case where projection is performed in the above-mentioned manner, a geometric distortion, which is called a trapezoidal distortion, occurs on the screen due to the tilt of a projector body with respect to the screen. To solve this problem, most of general projectors have a geometric correction function for correcting this trapezoidal distortion using signal processing (hereinafter referred to as the keystone correction function). As the keystone correction function, there is known a method of correcting distortion such that a user selects four corners of a projection area, and an area formed by moving the selected four corners to respective desired positions is set as the projection area (four-point correction).

In Japanese Laid-Open Patent Publication (Kokai) No. 2009-251542, there has been proposed, for keystone correction, a method that makes it possible to check a change in shape before and after correction, by projecting an image before correction and an image after correction in a superimposed state.

Further, keystone correction is performed not only by using a menu displayed on a main body of the projector or a remote controller attached to the projector, but also by using an operation terminal other than the projector and the remote controller of the projector, due to widespread use of smartphones and tablets.

For example, in Japanese Laid-Open Patent Publication (Kokai) No. 2015-154173, there has been proposed a method of performing keystone correction by touching a plurality of points displayed on a screen of an operation terminal.

Further, there has been known a method of performing keystone correction by displaying four corners indicative of a projection area on a touch pad included in the projector, and performing, after selecting one of the four corners or otherwise simultaneously selecting the four corners, a touch operation (see e.g. Japanese Laid-Open Patent Publication (Kokai) No. 2010-278806 and Japanese Laid-Open Patent Publication (Kokai) No. 2010-197843).

However, the projector described in Japanese Laid-Open Patent Publication (Kokai) No. 2009-251542 has a problem that a user can only stepwise set the keystone correction function by the key operation. Further, the technique disclosed in Japanese Laid-Open Patent Publication (Kokai) No. 2015-154173 has a problem that when moving the operation point to a position intended by a user on a projection plane, an amount of movement of the operation point on the projection plane is larger than an amount of movement of the same on the operation terminal side, and hence it is difficult to perform fine adjustment.

On the other hand, the techniques disclosed in Japanese Laid-Open Patent Publication (Kokai) No. 2010-278806 and Japanese Laid-Open Patent Publication (Kokai) No. 2010-197843 have a problem that in a case where an image is projected obliquely with respect to the projection plane, a direction in which a user moves a correction target point on the touch pad, and a direction in which the correction target point is moved on the projection plane deviate from each other as shown in FIGS. 12A and 12B, and hence it is difficult to perform fine adjustment.

SUMMARY OF THE INVENTION

The present invention provides a control device for correcting a projection image, which enables, when performing geometric correction, a user to accurately move a correction target point by performing an operation on an operation terminal, a projection system, a method of controlling the same, and a storage medium.

In a first aspect of the present invention, there is provided a control device for controlling a shape of a projection image projected by a projector, the control device comprising at least one processor and/or at least one circuit that perform(s) operations of the following units: a communication unit configured to communicate with the projector, a selection unit configured to select a target point of the projection image, a display control unit configured to display an image including an image indicative of the target point and a first pattern associated with the target point on a display section, and a reception unit configured to receive a user's operation for moving the target point of the projection image, wherein according to selection of the target point of the projection image by the selection unit, the communication unit transmits a first instruction for projecting a second pattern corresponding to the first pattern to the projector, and wherein according to the user's operation received by the reception unit, the communication unit transmits a second instruction for moving the target point of the projection image, to the projector.

In a second aspect of the present invention, there is provided a projection system including a projector, and a control device that controls the projector by communicating with the projector, the projector comprising a projection unit including a light source and a projection optical system, at least one processor and/or at least one circuit that perform(s) operations of the following units: a first communication unit configured to communicate with the control device, a shape correction unit configured to correct a shape of the projection image by moving a position of a target point of a first image according to an instruction, and a projection control unit configured to control the projection unit so as to cause the projection unit to project an image based on the first image processed by the shape correction unit, on a projection plane, the control device comprising a display having a touch panel, at least one processor and/or at least one circuit that perform(s) operations of the following units: a second communication unit configured to communicate with the projector, a selection unit configured to select a target point of the projection image according to a user's operation performed on the touch panel, a display control unit configured to display an image including an image indicative of the target point and a first pattern associated with the target point on a display section, a reception unit configured to receive a user's operation for moving the target point of the projection image, according to a user's operation performed on the touch panel, wherein according to selection of the target point of the projection image by the selection unit, the second communication unit transmits a first instruction indicative of the target point to the projector, wherein according to the first communication unit acquiring the first instruction from the control device, the projection unit projects an image including a pattern image associated with the selected target point and the first image processed by the shape correction unit, on the projection plane, wherein according to the user's operation received by the reception unit, the second communication unit transmits a second instruction for moving the target point of the projection image, to the projector, and wherein according to the first communication unit acquiring the second instruction from the control device, the projection control unit performs shape correction processing for moving the target point.

In a third aspect of the present invention, there is provided a method of controlling a shape of a projection image projected by a projector, comprising communicating with the projector, selecting a target point of the projection image, displaying an image including an image indicative of the target point and a first pattern associated with the target point, on a display section, receiving a user's operation for moving the target point of the projection image, transmitting a first instruction for projecting a second pattern corresponding to the first pattern to the projector, according to selection of the target point of the projection image, and transmitting a second instruction for moving the target point of the projection image according to the received user's operation, to the projector.

In a fourth aspect of the present invention, there is provided a method of controlling a projection system including a projector provided with a projection unit including a light source and a projection optical system and a first communication unit configured to communicate with a control device, and the control device provided with a display having a touch panel and a second communication unit configured to communicate with the projector, for controlling the projector by communicating with the projector, the method comprising causing the projector to correct a shape of the projection image by moving the position of a target point of a first image according to an instruction, project an image which is based on the first image and is corrected in shape, on a projection plane, causing the control device to select a target point of the projection image according to a user's operation performed on the touch panel, display an image including an image indicative of the target point and a first pattern associated with the target point, on a display section, receive a user's operation for moving the target point of the projection image according to a user's operation performed on the touch panel, cause the second communication unit to transmit a first instruction indicative of the target point to the projector, according to selection of the target point of the projection image, causing the projector to cause the projection unit to project an image including a pattern image associated with the selected target point and the first image corrected in shape, on the projection plane, according to the first communication unit acquiring the first instruction from the control device, causing the control device to control the second communication unit to transmit a second instruction for moving the target point of the projection image according to the received user's operation, to the projector, and causing the projector to perform shape correction processing for moving the target point according to the first communication unit acquiring the second instruction from the control device.

In a fifth aspect of the present invention, there is provided a non-transitory computer-readable storage medium storing a computer-executable program for executing a method of controlling a shape of a projection image projected by a projector, wherein the method comprises communicating with the projector, selecting a target point of the projection image, displaying an image including an image indicative of the target point and a first pattern associated with the target point, on a display section, receiving a user's operation for moving the target point of the projection image, transmitting a first instruction for projecting a second pattern corresponding to the first pattern to the projector, according to selection of the target point of the projection image, and transmitting a second instruction for moving the target point of the projection image according to the received user's operation, to the projector.

In a sixth aspect of the present invention, there is provided a non-transitory computer-readable storage medium storing a computer-executable program for executing a method of controlling a projection system including a projector provided with a projection unit including a light source and a projection optical system and a first communication unit configured to communicate with the control device, and a control device provided with a display having a touch panel and a second communication unit configured to communicate with the projector, that controls the projector by communicating with the projector, wherein the method comprises causing the projector to correct a shape of the projection image by moving the position of a target point of a first image according to an instruction, project an image which is based on the first image and is corrected in shape, on a projection plane, causing the control device to select a target point of the projection image according to a user's operation performed on the touch panel, display an image including an image indicative of the target point and a first pattern associated with the target point, on a display section, receive a user's operation for moving the target point of the projection image according to a user's operation performed on the touch panel, cause the second communication unit to transmit a first instruction indicative of the target point to the projector, according to selection of the target point of the projection image, causing the projector to cause the projection unit to project an image including a pattern image associated with the selected target point and the first image corrected in shape, on the projection plane, according to the first communication unit acquiring the first instruction from the control device, causing the control device to control the second communication unit to transmit a second instruction for moving the target point of the projection image according to the received user's operation, to the projector, and causing the projector to perform shape correction processing for moving the target point according to the first communication unit acquiring the second instruction from the control device.

According to the present invention, when performing geometric correction, the user can accurately move the correction target point by performing an operation on the operation terminal.

Further features of the present invention will become apparent from the following description of exemplary embodiments (with reference to the attached drawings).

BRIEF DESCRIPTION OF THE DRAWINGS

FIG. 4A is a block diagram showing an internal configuration of an image processor appearing in FIG. 2.

FIGS. 4B to 4E are diagrams showing contents of video signals obtained as results of processing operations performed by components of the image processor appearing in FIG. 4A.

FIGS. 11A to 11H are diagrams useful in explaining processing for drawing a moving direction guide, using an OSD superimposition section of the image processor of the projector.

DESCRIPTION OF THE EMBODIMENTS

The present invention will now be described in detail below with reference to the accompanying drawings showing embodiments thereof. The embodiments described below are preferred embodiments of the invention, but do not limit the scope of the invention.

Figure 1A:
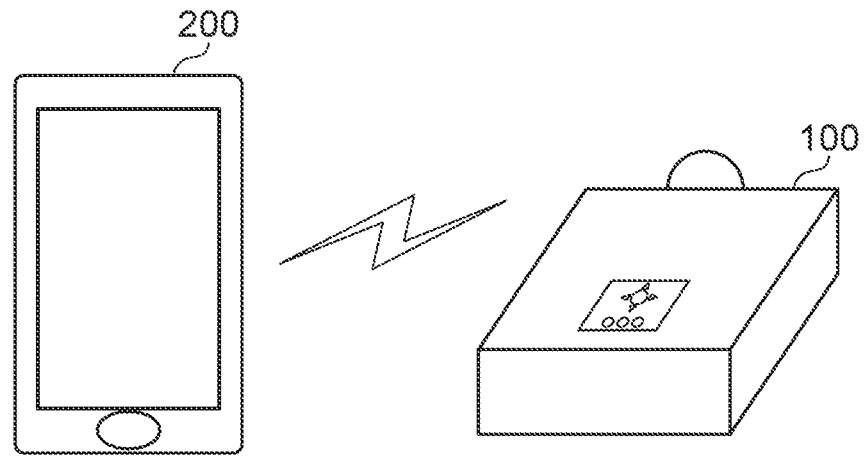
FIG. 1A is a schematic view of a system including a tablet as a control device according to a first embodiment.
Figure 1B:
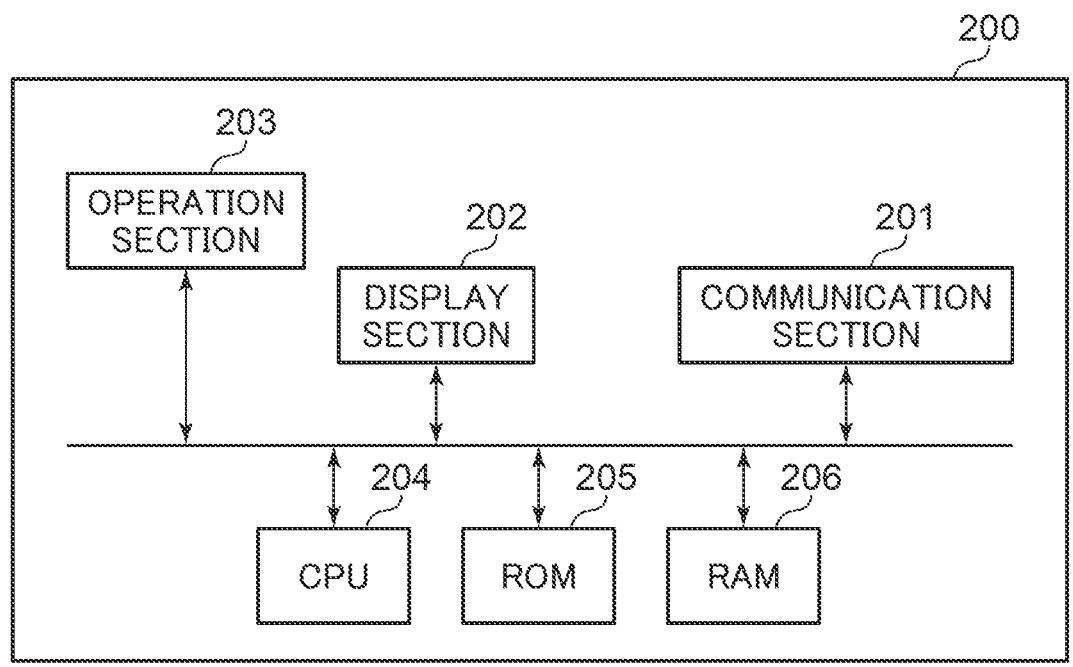
FIG. 1B is a block diagram showing a hardware configuration of the tablet appearing in FIG. 1A.

FIG. 1A is a schematic view showing system constitution including a tablet 200 as a control device according to a first embodiment of the present invention, and FIG. 1B is a block diagram showing hardware configuration of the tablet 200.

In the system shown in FIG. 1A, the tablet 200 and a projector 100 as a projection apparatus form a communication network via a wireless LAN. Further, in the present embodiment, the tablet 200 establishes communication with a Web server included in the projector 100.

As shown in FIG. 1B, the tablet 200 includes a communication section 201, a display section 202, an operation section 203, a CPU 204, a ROM 205, and a RAM 206.

The communication section 201 receives a control signal, still image data, moving image data, and so forth, from an external apparatus.

The display section 202 displays an operation screen and switch icons for operating the tablet 200. The display section 202 is not particularly limited insofar as it can display an image, and may be, for example, a liquid crystal display, a CRT display, an organic EL display, an LED display, or the like.

The operation section 203 is used for receiving an instruction from a user, and transmitting an instruction signal to the CPU 204, and is comprised of switches, dials, and a touch panel provided on the display section 202.

The CPU 204 controls operation blocks forming the tablet 200, and the ROM 205 stores control programs describing processing procedures performed by the CPU 204. Further, the CPU 204 receives control signals input via the operation section 203 and the communication section 201, and controls the operation blocks of the tablet 200.

The RAM 206 functions as a work memory to temporarily store control programs and data.

Next, the configuration of the projector 100 will be described. In the present embodiment, as the projector 100, a liquid crystal projector using a transmission type liquid crystal panel as a display device is used. However, the projection apparatus is not limited to the projector using the transmission type liquid crystal panel as the display device, but a projector using a DLP type display device, a LCOS (liquid crystal on silicon) panel, or the like as the display device may be used. Further, as the liquid crystal projector, a single-plate projector, a three-plate projector, and so forth, are generally known, and any type of them may be used.

The projector 100 used in the present embodiment presents a projection image to a user by controlling the light transmittances of a liquid crystal device according to an image to be displayed, and projecting light from a light source, which is transmitted through the liquid crystal device, to a screen (projection plane), not shown.

First, the whole configuration of the projector 100 used in the present embodiment will be described with reference to FIG. 2.

Figure 2:
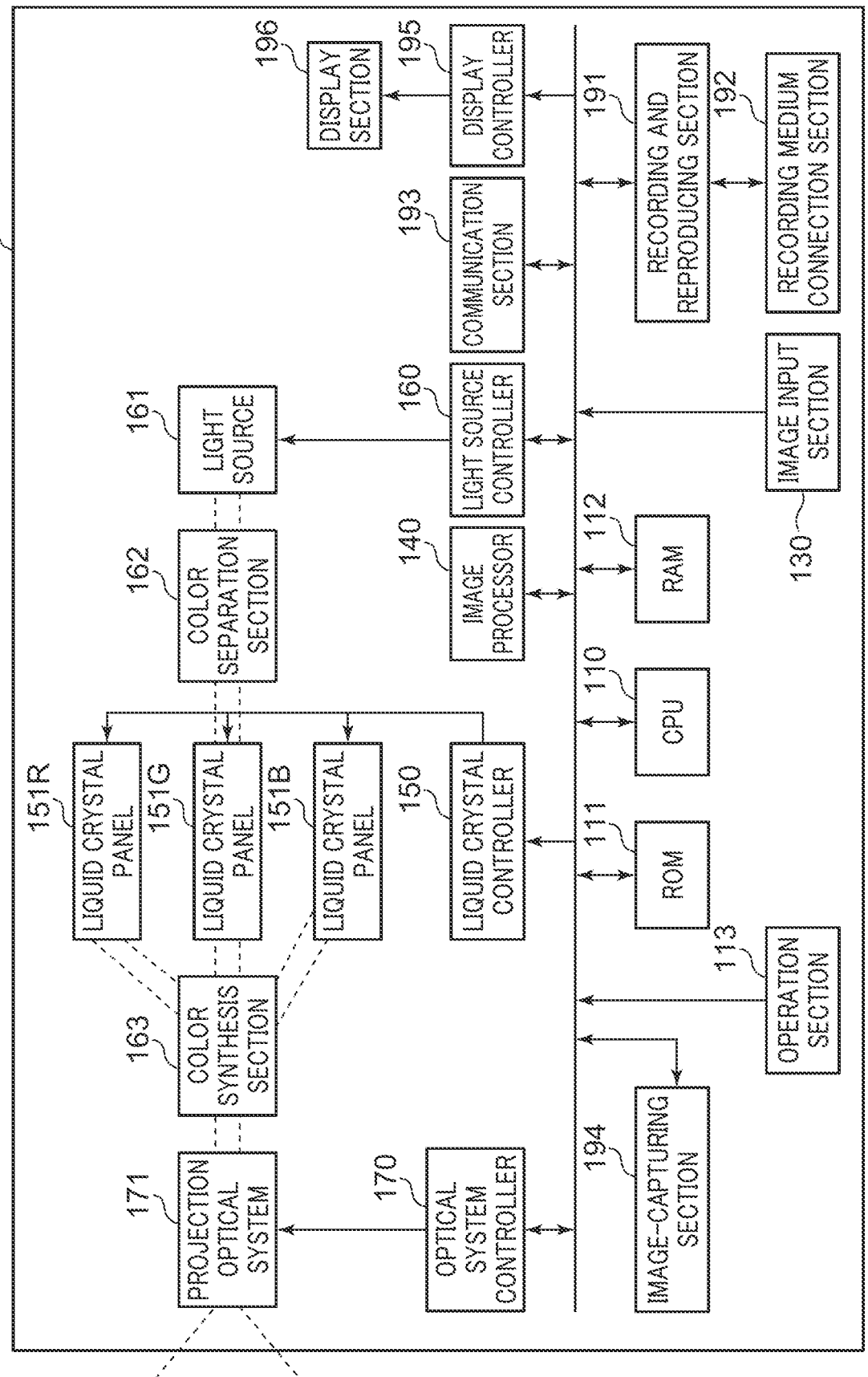
FIG. 2 is a block diagram showing a whole configuration of a projector.

FIG. 2 is a block diagram showing the whole configuration of the projector 100.

The projector 100 includes a CPU 110, a ROM 111, a RAM 112, an operation section 113, an image input section 130, and an image processor 140. Further, the projector 100 includes a liquid crystal controller 150, liquid crystal panels 151R, 151G, and 151B, a light source controller 160, a light source 161, a color separation section 162, a color synthesis section 163, an optical system controller 170, and a projection optical system 171. The projector 100 further includes a recording and reproducing section 191, a recording medium connection section 192, and a communication section 193. The projector 100 may further include an image-capturing section 194, a display controller 195, and a display section 196.

The CPU 110 controls operation blocks of the projector 100, the ROM 111 is used for storing control programs describing processing procedures performed by the CPU 110, and the RAM 112 temporarily stores control programs and data as a work memory. Further, the CPU 110 reads still image data or moving image data from a recording medium, such as an USB memory, connected to the recording medium connection section 192, temporarily stores the read data, and causes the recording and reproducing section 191 to reproduce the image or video of the stored still image data or moving image data using a program stored in the ROM 111. Further, the CPU 110 temporarily stores still image data or moving image data received via the communication section 193, and causes the recording and reproducing section 191 to reproduce the image or video of the stored still image data or moving image data using the program stored in the ROM 111. Further, the CPU 110 temporarily stores an image and a video obtained by the image-capturing section 194 in the RAM 112, and converts the image and the video to still image data and moving image data to thereby record the still image data and the moving image data in a recording medium, such as a USB memory, connected to the recording medium connection section 192, using a program stored in the ROM 111.

The operation section 113 is used for receiving an instruction from a user, and transmitting an instruction signal to the CPU 110, and is comprised of switches, dials, and a touch panel provided on the display section 196. Further, the operation section 113 may transmit a predetermined instruction signal to the CPU 110, based on a signal received by a signal receiving section (such as an infrared receiving section) that receives a signal output from a remote controller. Further, the CPU 110 receives a control signal input via the operation section 113 or the communication section 193, and controls operation blocks of the projector 100 based on the received control signal.

The image input section 130 receives a video signal from an external apparatus, and includes a composite terminal, an S-video terminal, a D terminal, a component terminal, an analog RGB terminal, a DVI-I terminal, a DVI-D terminal, an HDMI (registered trademark) terminal, etc. In a case where an analog video signal is received, the image input section 130 converts the received analog video signal to a digital video signal. Then, the image input section 130 transmits the received video signal to the image processor 140. Here, the external apparatus may be any kind of apparatuses, such as a personal computer, a camera, a mobile phone, a smartphone, a hard disk recorder, and a game machine, insofar as it is capable of outputting a video signal.

The image processor 140 is configured to perform processing for changing the number of frames, the number of pixels, a shape of an image, and so forth, on a video signal received from the image input section 130, and transmit the processed video signal to the liquid crystal controller 150, and is implemented e.g. by a microprocessor for image processing. However, the image processor 140 is not necessarily required to be implemented by a dedicated microprocessor, and for example, the CPU 110 may perform the same processing as that performed by the image processor 140 according to a program stored in the ROM 111. The image processor 140 is capable of performing functions, such as frame thinning processing, frame interpolation processing, resolution conversion processing, OSD superimposition processing for superimposing a menu or the like, geometric correction processing (keystone correction processing), and edge blending. Further, the image processor 140 is capable of performing the above-mentioned changing processing not only on a video signal received from the image input section 130, but also on an image or a video reproduced by the CPU 110.

The liquid crystal controller 150 is implemented by a microprocessor that controls voltages applied to liquid crystals of pixels of the liquid crystal panels 151R, 151G, and 151B based on the video signal processed by the image processor 140. The light transmittances of the liquid crystal panels 151R 151G, and 151B are adjusted by this voltage control. Further, the liquid crystal controller 150 is not necessarily required to be implemented by a dedicated microprocessor, and for example, the CPU 110 may perform the same processing as that performed by the liquid crystal processor 150 according to a program stored in the ROM 111. For example, in a case where a video signal is input to the image processor 140, whenever an image of one frame is received from the image processor 140, the liquid crystal controller 150 controls the liquid crystal panels 151R, 151G, and 151B to adjust the light transmittances thereof according to the received image. The liquid crystal panel 151R is a liquid crystal panel associated with red, and adjusts the light transmittances of red (R) out of the lights of red (R), green (G), and blue (B) which are obtained by separating light output from the light source 161 by the color separation section 162. The liquid crystal panel 151G is a liquid crystal panel associated with green, and adjusts the light transmittances of green (G) separated by the color separation section 162. The liquid crystal panel 151B is a liquid crystal panel associated with blue, and adjusts the light transmittances of blue (B) separated by the color separation section 162.

Details of the operation of controlling the liquid crystal panels 151R, 151G, and 151B (hereinafter simply referred to as the "liquid crystal panels 151"), performed by the liquid crystal controller 150, and the configuration of the liquid crystal panels 151 will be described hereinafter.

The light source controller 160 controls on/off of the light source 161 and the amount of light emitted from the light source 161, and is implemented by a microprocessor for control. However, the light source controller 160 is not necessarily required to be implemented by a dedicated microprocessor, and for example, the CPU 110 may perform the same processing as that performed by the light source controller 160 according to a program stored in the ROM 111. Further, the light source 161 outputs light for projecting an image to a screen, not shown, and may be a halogen lamp, a xenon lamp, a high-pressure mercury lamp, or the like. Further, the color separation section 162 separates light output from the light source 161 into respective lights of red (R), green (G), and blue (B), and is formed by a dichroic mirror, a prism, or the like. Note that in a case where LEDs and the like associated with the colors are used as the light source 161, the color separation section 162 is not required. The color synthesis section 163 synthesizes the lights of red (R), green (G), and blue (B), transmitted through the liquid crystal panels 151, and is formed by a dichroic mirror, a prism, or the like. Then, the light obtained by synthesizing the respective components of red (R), green (G), and blue (B) by the color synthesis section 163 is sent to the projection optical system 171. At this time, the liquid crystal panels 151 are controlled by the liquid crystal controller 150 to adjust the light transmittances according to an image input from the image processor 140. Therefore, when the light synthesized by the light synthesis section 163 is projected to the screen by the projection optical system 171, an image corresponding to the image input by the image processor 140 is displayed on the screen.

The optical system controller 170 controls the projection optical system 171, and is implemented by a microprocessor for control. However, the optical system controller 170 is not necessarily required to be implemented by a dedicated microprocessor, and for example, the CPU 110 may perform the same processing as that performed by the optical system controller 170 according to a program stored in the ROM 111. Further, the projection optical system 171 is formed by a plurality of lenses and an actuator for driving the lenses, and causes the actuator to drive each lens to thereby expand and reduce a projection image, and adjust the focus so as to project the synthesized light output from the color synthesis section 163 to the screen.

The recording and reproducing section 191 reproduces still image data or moving image data acquired from a recording medium, such as a USB memory, which is connected to the recording medium connection section 192, and records still image data or moving image data of an image or a video, which is captured by the image-capturing section 194, in a recording medium. Further, the recording and reproducing section 191 may record still image data and moving image data received via the communication section 193 in a recording medium. The recording medium connection section 192 is an interface which is electrically connected to a recording medium, and the recording and reproducing section 191 is implemented by a microprocessor or a dedicated circuit for communicating with the recording medium via the recording medium connection section 192. Further, the recording and reproducing section 191 is not necessarily required to be implemented by a dedicated microprocessor, and for example, the CPU 110 may perform the same processing as that performed by the recording and reproducing section 191 according to a program stored in the ROM 111.

The communication section 193 is used for receiving a control signal, still image data, moving image data, etc., from an external apparatus, and may be a wireless LAN, a wired LAN, a USB, Bluetooth (registered trademark), or the like, and the communication method is not particularly limited. Further, if the terminal of the image input section 130 is an HDMI (registered trademark) terminal, the communication section 193 may perform CEC communication via the HDMI terminal. Here, the external apparatus may be any kind of apparatuses, such as a personal computer, a camera, a mobile phone, a smartphone, a hard disk recorder, a game machine, and a remote controller, insofar as it is capable of communicating with the projector 100.

The image-capturing section 194 captures an image around the projector 100 to thereby acquire an image signal, and is capable of capturing an image projected via the projection optical system 171 (performing image capturing toward the screen). The image-capturing section 194 transmits the captured image or video to the CPU 110, and the CPU 110 temporarily stores the received image or video in the RAM 112, and converts the image or video to still image data or moving image data according to a program stored in the ROM 111. The image-capturing section 194 includes a lens for forming an optical image of an object, an actuator which drives the lens, a microprocessor which controls the actuator, an image-capturing device which converts the optical image captured through the lens to an image signal, and an analog-to-digital converter which converts the image signal output from the image-capturing device to a digital signal. The image-capturing section 194 is not limited to the one which performs image capturing toward the screen, but may capture an image on a viewer side opposite from the screen.

The display controller 195 performs control for displaying an image of an operation screen for operating the projector 100, switch icons, and the like, on the display section 196 provided on the projector 100, and is implemented by a microprocessor for display control, etc. However, the display controller 195 is not necessarily required to be implemented by a dedicated microprocessor, and for example, the CPU 110 may perform the same processing as that performed by the display controller 195 according to a program stored in the ROM 111. The display section 196 displays the operation screen and the switch icons for operating the projector 100. The display section 196 may be any type of display, insofar as it can display an image. For example, the display section 196 may be implemented by a liquid crystal display, a CRT display, an organic EL display, an LED display, or the like. Further, to enable a user to recognize a specific button, an LED or the like corresponding to each button may be lighted.

Note that the image processor 140, the liquid crystal controller 150, the light source controller 160, the optical system controller 170, the recording and reproducing section 191, and the display controller 195 may be a single or a plurality of microprocessor(s) that is/are capable of performing the same processing operations performed by these blocks. Alternatively, for example, the CPU 110 may perform the same processing operations performed by these blocks according to programs stored in the ROM 111.

Next, the basic operation of the projector 100 according to the present embodiment will be described with reference to FIG. 3.

Figure 3:
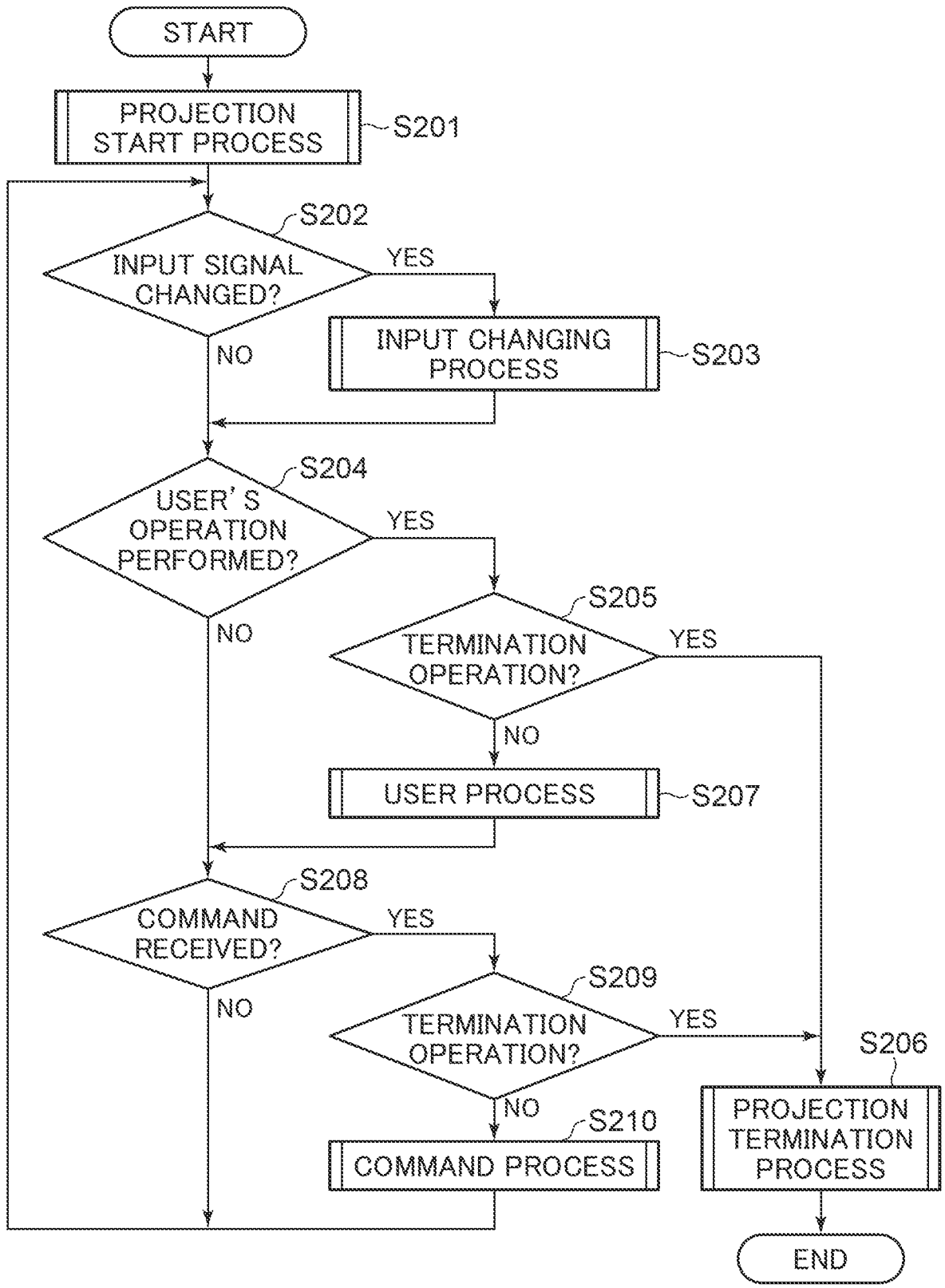
FIG. 3 is a flowchart of a process for controlling the basic operation of the projector.

FIG. 3 is a flowchart of a basic operation control process for controlling the basic operations of the projector 100. The operations in FIG. 3 are basically realized by control of the function blocks performed by the CPU 110 based on a program stored in the ROM 111. The basic operation control process in FIG. 3 is started when the user provides an instruction for powering on the projector 100 via the operation section 113 or the remote controller, not shown.

When the user provides an instruction for powering on the projector 100 via the operation section 113 or the remote controller, not shown, the CPU 110 causes a power supply section, not shown, to supply electric power from a power supply circuit, not shown, to the components of the projector 100, and performs a projection start process (step S201). More specifically, the CPU 110 instructs the light source controller 160 to control lighting of the light source 161, instructs the liquid crystal controller 150 to control driving of the liquid crystal panels 151, makes settings of the operation of the image processor, and so forth.

Next, the CPU 110 determines whether or not an input signal from the image input section 130 has been changed (step S202). If the input signal has not been changed, the CPU 110 proceeds to a step S204, whereas if the input signal has been changed, the CPU 110 performs an input changing process (step S203). Here, the input changing process refers to processing operations for detecting a resolution, a frame rate, and so forth, of the input signal, sampling an input image at a timing suitable for the detection, and executing necessary image processing on the sampled input image, for projection.

Next, the CPU 110 determines whether or not a user's operation has been performed (step S204). If no user's operation has been performed, more specifically, if a user has not operated the operation section 113 or the remote controller, the CPU 110 proceeds to a step S208, whereas if a user's operation has been performed, the CPU 110 determines whether or not the user's operation is a termination operation (step S205). If the user's operation is a termination operation, the CPU 110 performs a projection termination process, followed by terminating the present process (step S206). Here, the projection termination process specifically refers to processing operations for instructing the light source controller 160 to control turn-off of the light source 161, instructing the liquid crystal controller 150 to control stop of driving of the liquid crystal panels 151, storing the necessary settings in the ROM 111, and so forth.

If the user's operation is not a termination operation, the CPU 110 performs a user process associated with the user's operation (step S207). For example, the CPU 110 performs processing for changing placement settings, processing for changing the input signal, processing for changing image processing, processing for displaying information, or the like.

Next, the CPU 110 determines whether or not a command has been received via the communication section 193 (step S208). If no command has been received, the CPU 110 returns to the step S202. If a command has been received, the CPU 110 determines whether or not the received command is a command based on a user's termination operation (step S209). If the received command is a command based on a user's termination operation, the CPU 110 proceeds to the step S206. If the received command is not a command based on a user's termination operation, the CPU 110 performs a command process associated with the received command (step S210). For example, the CPU 110 performs processing for making placement settings, processing for making input signal settings, processing for making image processing settings, processing for state acquisition, or the like.

The projector 100 according to the present embodiment is capable of not only displaying a video input via the image input section 130, but also loading still image data and moving image data, which are read by the recording and reproducing section 191 from a recording medium connected to the recording medium connection section 192, into the RAM 112, and displaying an image of the still image data and a video of the moving image data. Further, the projector 100 is capable of loading still image data and moving image data, which are received via the communication section 193, into the RAM 112, and displaying an image of the still image data and a video of the moving image data.

Next, a detailed description will be given of characteristic configuration of the present embodiment.

FIG. 4A is a block diagram useful in explaining details of the internal configuration of the image processor 140 of the projector 100 shown in FIG. 2.

FIGS. 4B to 4E are diagrams showing contents of video signals sig302 to sig305, respectively, obtained as results of processing operations, as performed from formation of a projection image based on a video signal sig301 input to the image processor 140 to transmission of the projection image to the liquid crystal controller 150.

The image processor 140 is comprised of a first processing section 141, an OSD superimposition section 142, a keystone correction section 143, and an operation target area superimposition section 144. The first processing section 141 performs acquisition of statistical information including a histogram and an APL (Average Picture Level), IP conversion, frame rate conversion, resolution conversion, y conversion, color gamut conversion, color correction, edge emphasis, and so forth, on a video signal. The OSD superimposition section 142 superimposes an OSD (On Screen Display) on the video signal processed and output by the first processing section 141 (video signal sig302 shown in FIG. 4B). For example, as shown in FIG. 4C, the video signal sig303 on which a menu 401 used by the user to check the settings is superimposed as the OSD is output from the OSD superimposition section 142. The keystone correction section 143 outputs the video signal sig304 obtained by modifying the video signal sig303 output from the OSD superimposition section 142 to a desired rectangle. As shown in FIG. 4D, in a case where the video signal is modified by the keystone correction section 143 such that upper and lower right end points of the video signal are moved inward, the OSD superimposed on the video signal is also modified.

The operation target area superimposition section 144 outputs the video signal sig305 on which a shape pattern is superimposed in an operation target area 402 as shown in FIG. 4E. The operation target area 402 is an area including an end point selected as a correction target point, referred to hereinafter, out of four vertexes of the input video signal sig304, and also includes an area outside the area modified by the keystone correction section 143. The operation target area refers to an area in which an end point of a projection image can be moved, and details of the operation target area will be described hereinafter.

Next, a four-point keystone correction process performed in the present embodiment will be described.

Figure 5A:
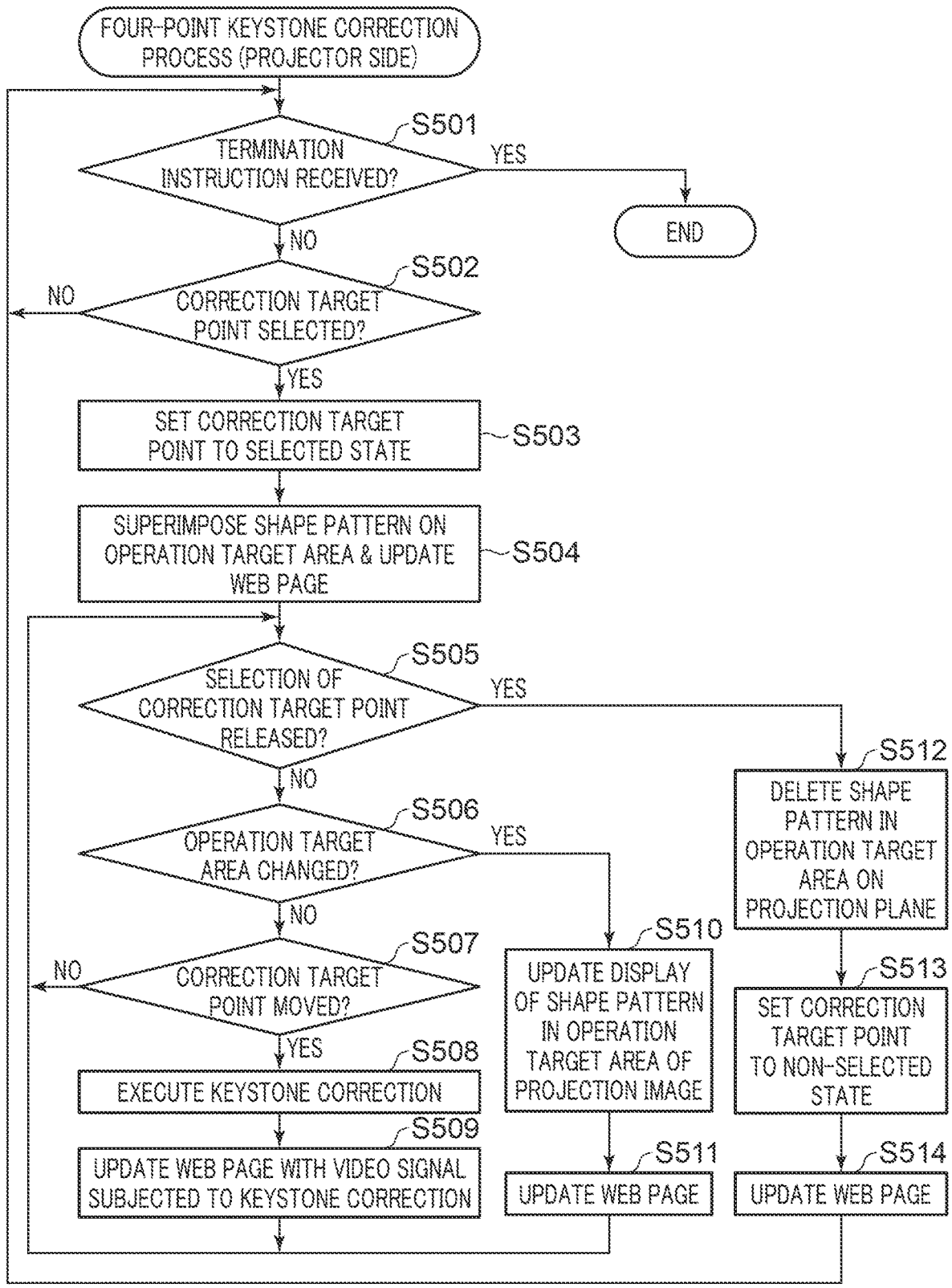
FIG. 5A is a flowchart of a four-point keystone correction process according to the first embodiment, which is performed by a CPU of the projector.

FIG. 5A is a flowchart of the four-point keystone correction process performed by the CPU 110 of the projector 100.

Figure 6A:
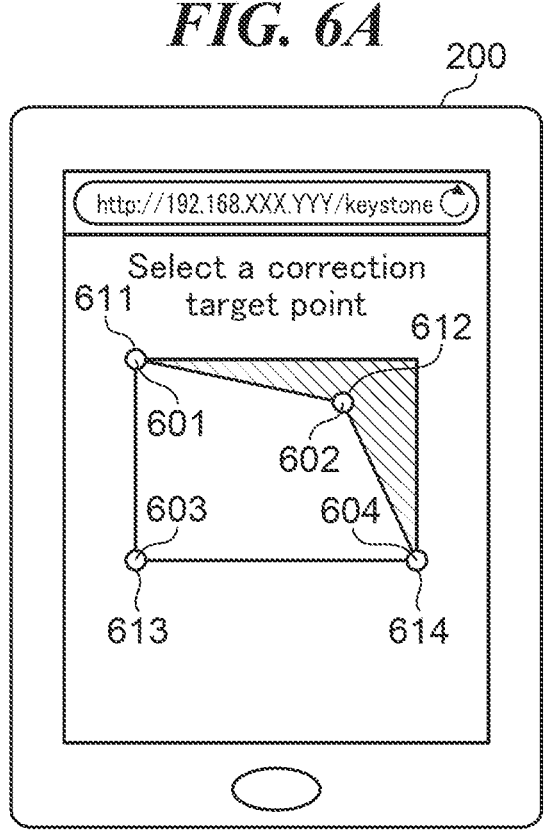
FIGS. 6A to 6H are diagrams showing states of an operation screen of the tablet and a projection plane of the projector.
Figure 6B:
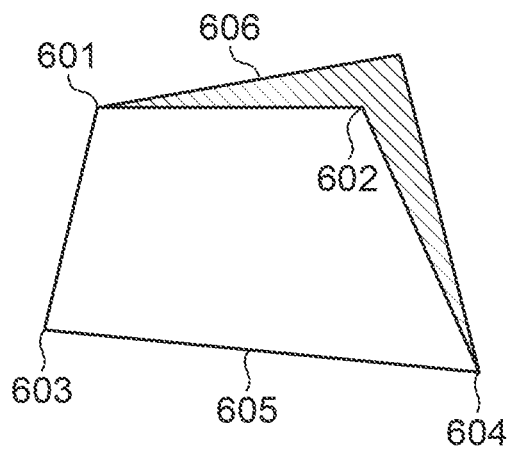

The four-point keystone correction process in FIG. 5A, performed by the projector 100, is started when the user accesses a predetermined URL for use in four-point keystone adjustment of the projector 100, using the tablet 200. When the above-mentioned access is made, such a Web page (instruction screen) as shown in FIG. 6A, is displayed on the display section 202 of the tablet 200. Note that explanation of the four-point keystone correction process in FIG. 5A is given assuming that an upper right point of a projection image to be projected on the projection plane has already been selected as the correction target point, referred to hereinafter, on the tablet 200, and further, the correction target point has been moved inward. That is, such a projection image as shown in FIG. 6B is projected on the projection plane of the projector 100 at the start of the present explanation. Referring to FIG. 6B, an outer trapezoid 606 represents a range indicative of the whole area of the projection plane of the projector 100, and a trapezoid 605 inside the trapezoid 606 represents a range of a projection image after being subjected to four-point keystone correction. A hatched area between the outer trapezoid 606 and the inner trapezoid 605 is an area in which a video ceases to be displayed as a result of four-point keystone correction.

When the four-point keystone correction process is started, the CPU 110 acquires information received via the operation section 113, and determines whether or not a termination instruction has been provided by the user (step S501). The termination instruction refers to an operation of powering off the projector 100 or turning off the network function. If a termination instruction has been provided, the CPU 110 terminates the Web server within the projector 100, followed by terminating the present process.

If it is determined that the termination instruction has been provided by the user (YES to the step S501), the CPU 110 determines via the communication section 193 whether or not a correction target point has been selected on the tablet 200 (step S502). Note that the correction target point refers to an end point at any of four corners of the area of the projection image on which four-point keystone correction is to be performed, and refers to any of end points 601 to 604 in FIGS. 6A and 6B. In a case where the user taps (selects) one of markers 611 to 614 each of which indicates that an associated one of the end points 601 to 604 can be selected, on the display section 202 of the tablet 200, it is determined that the correction target point is selected. If it is determined that the correction target point has been selected, the CPU 110 sets the selected end point to a selected state (step S503). On the other hand, if it is determined in the step S502 that the correction target point has not been selected, the CPU 110 returns to the step S501, and monitors again whether or not a terminal instruction has been provided.

Figure 6C:
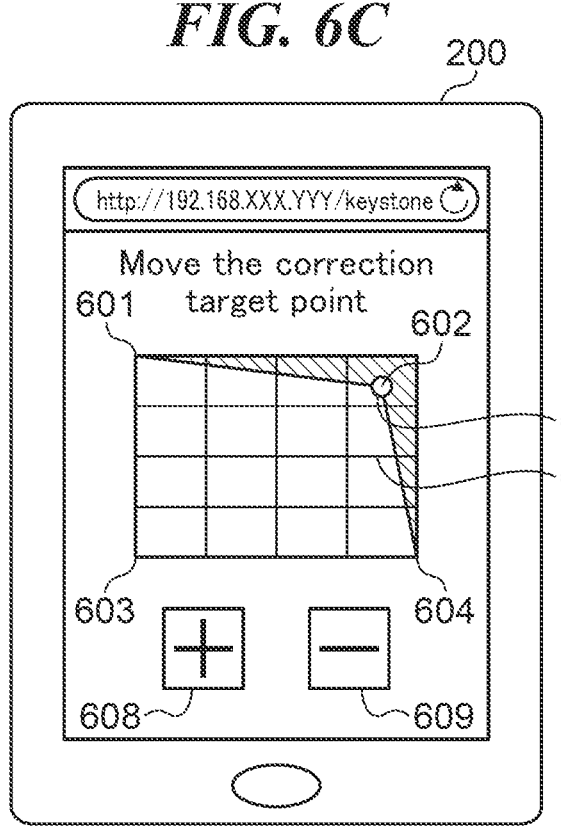
Figure 6D:
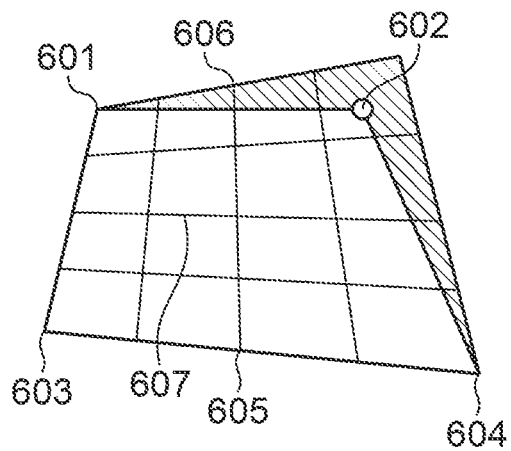

Next, the CPU 110 proceeds from the step S503 to a step S504, and instructs the operation target area superimposition section 144 to superimpose a shape pattern 607 on the video signal as a guide pattern in the operation target area including the end point selected as the correction target point. Here, the whole area of the projection plane corresponds to the operation target area. Therefore, the operation target range corresponds to the trapezoid 606 indicative of the whole area of the projection plane, as shown in FIG. 6D. In the present embodiment, the shape pattern 607 is a grid pattern which equally divides each of vertical and horizontal operation target ranges (into four equal sections in the present embodiment) in association with the coordinate system of a plane of the liquid crystal panel 151. However, the shape pattern 607 displayed in the step S504 is only required to have a plurality of feature points which can be recognized by the user, and is not limited to the grid pattern having dividing lines which are vertically and horizontally orthogonal to each other as used in the present embodiment. After that, the CPU 110 updates the Web page displayed on the display section 202 of the tablet 200 via the communication section 193. FIG. 6C shows an example of the updated Web page. FIG. 6C shows a state of display on the display section 202 of the tablet 200, in which the upper right end point 602 has been selected as the correction target point. In FIG. 6C, to indicate the fact that the end point 602 has been selected as the correction target point, the color of the marker 612 is changed. In response to this, in FIG. 6D, to indicate the fact that the end point 602 has been selected as the correction target point, a circle marker is added only to the end point 602 out of the end points 601 to 604. Further, a display enlargement button 608 and a display reduction button 609 for changing the operation target area are displayed on a lower part of the Web page. Note that the screen shown in FIG. 6C is used by way of example, but any other expression may be used insofar as it can indicate the state in which the end point 602 has been selected as the correction target point. For example, the size and the shape of the end point 602 may be changed before and after being selected as the correction target point. The display enlargement button 608 and the display reduction button 609 are also shown by way of example, and the display may be enlarged or reduced by using a slide bar or the like.

Next, the CPU 110 determines via the communication section 193 whether or not the correction target point has been released from the selected state on the tablet 200 (step S505). The correction target point is released from the selected state by tapping a place on the display section 202 of the tablet 200 other than the end point 602 selected as the correction target point. Note that a button dedicated to clearing of the selected state may be provided on the operation section 203 of the tablet 200 so as to release the correction target point from the selected state by pressing this button.

If it is determined in the step S505 that the correction target point has been released from the selected state, the CPU 110 instructs the operation target area superimposition section 144 to delete the shape pattern 607 displayed in the operation target area (step S512). Then, the CPU 110 sets the correction target point to the non-selected state (step S513), updates the Web page displayed on the tablet 200 such that the shape pattern 607 indicative of the operation target area ceases to be displayed (step S514), then returns to the step S501 to continue the present process.

If it is determined in the step S505 that the correction target point has not been released from the selected state, the CPU 110 determines via the communication section 193 whether or not the operation target area has been changed on the tablet 200 (step S506). The operation of changing the operation target area is performed when the user presses one of the display enlargement button 608 and the display reduction button 609 on the display section 202 of the tablet 200. Note that the whole projection plane corresponds to the operation target area on the Web page updated in the step S504, and hence the operation target area can only be changed by pressing the display enlargement button 608. Therefore, here, the following description is given assuming that the display enlargement button 608 has been pressed. If it is determined in the step S506 that the operation target area has been changed, the CPU 110 instructs the operation target area superimposition section 144 to display the shape pattern 607 in the changed operation target area (step S510). As a result, the projection image is changed into a state shown in FIG. 6F. Although the whole projection plane is the operation target area in FIG. 6D, in FIG. 6F, an area which includes the end point 602 selected as the correction target point and has a longitudinal length and a lateral width corresponding to ½ of those of the whole projection plane is set to the operation target area. Note that the operation target area is set to upper left part of the projection plane if the end point 601 is selected as the correction target point, to lower left part of the same if the end point 603 is selected, and to lower right part of the same if the end point 604 is selected, such that in each case, the correction target point is included. Although in the present embodiment, the longitudinal length and the lateral width of the operation target area are changed to ½ of those of the whole projection plane, this is not limitative, but the operation target area is only required to be reduced to a size smaller than the size of the whole projection plane.

Figure 6E:
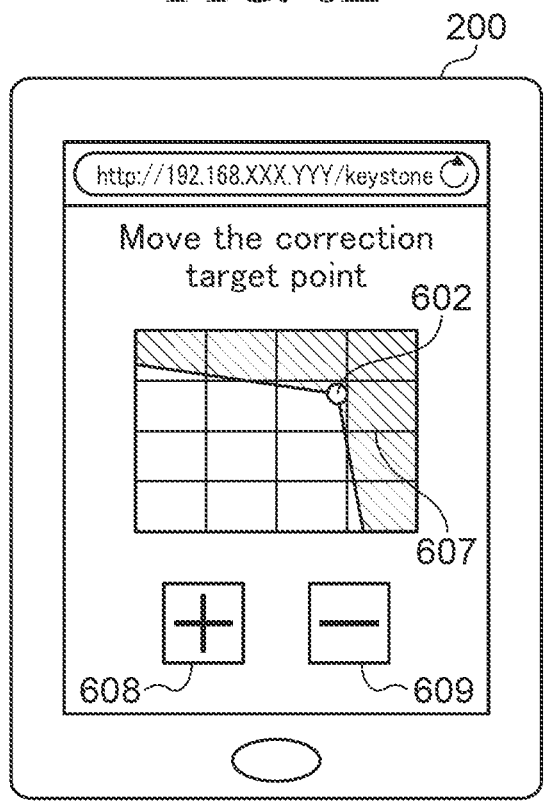
Figure 6F:
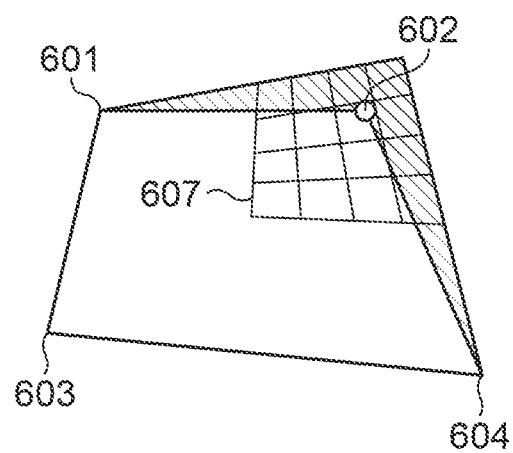

Next, the CPU 110 updates the Web page displayed on the display section 202 of the tablet 200 via the communication section 193 (step S511), and then returns to the step S505. As shown in FIG. 6E, the Web page displays, part of the video signal corresponding to only the operation target area, which has been changed in the step S510, in an enlarged state. This enables the user to obtain an operation feeling that the user has enlarged the projection plane on the display section 202 of the tablet 200, and as a result, the user can more finely move the correction target point in a step S507, described hereinafter.

Figure 6G:
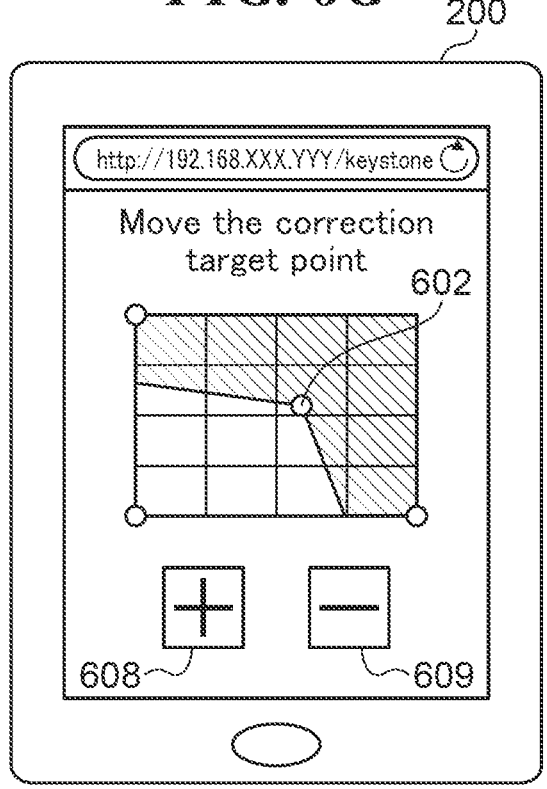
Figure 6H:
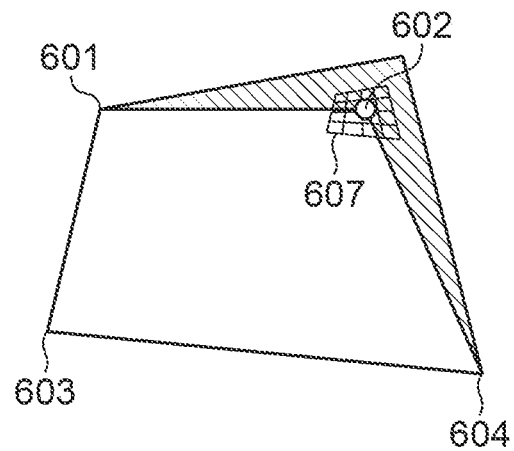

Note that if the display enlargement button 608 has been pressed again (YES to the step S506), the CPU 110 instructs the operation target area superimposition section 144 to display the shape pattern 607 (see FIG. 6H) in the operation target area which is further reduced (step S510). Although in the present embodiment, an area which includes the end point 602 selected as the correction target point and has the longitudinal length and the lateral width corresponding to ¼ of those of the whole projection plane is set to the operation target area, this is not limitative insofar as the area is set to be smaller in both of the longitudinal length and the lateral width than the operation target area shown in FIG. 6F. In the step S511, the CPU 110 updates the Web page displayed on the display section 202 of the tablet 200 via the communication section 193, and then returns to the step S505. With this, the Web page display part of the video signal corresponding to only part of the operation target area having the shape pattern 607 shown in FIG. 6H, in an enlarged state, as shown in FIG. 6G. Note that in a case where the display reduction button 609 is continuously pressed twice from this state, the display and the projection image sequentially return to the states shown in FIGS. 6C and 6D.

If it is determined in the step S506 that the operation target area has not been changed, the CPU 110 determines via the communication section 193 whether or not the correction target point has been moved on the tablet 200 (step S507). The correction target point is moved e.g. by an operation of dragging the end point 602 as the correction target point on the display section 202 of the tablet 200.

If it is determined in the step S507 that the correction target point has not been moved, the CPU 110 returns to the step S505 to continue the present process. On the other hand, if it is determined in the step S507 that the correction target point has been moved, the CPU 110 proceeds to a step S508.

In the step S508, the CPU 110 controls the keystone correction section 143 to perform four-point keystone correction on the video signal using position information of the moved correction target point as a modification parameter for keystone correction. Next, the CPU 110 updates the Web page displayed on the display section 202 of the tablet 200 based on the keystone correction information via the communication section 193 (step S509), then returns to the step S505 to continue the present process.

Figure 5B:
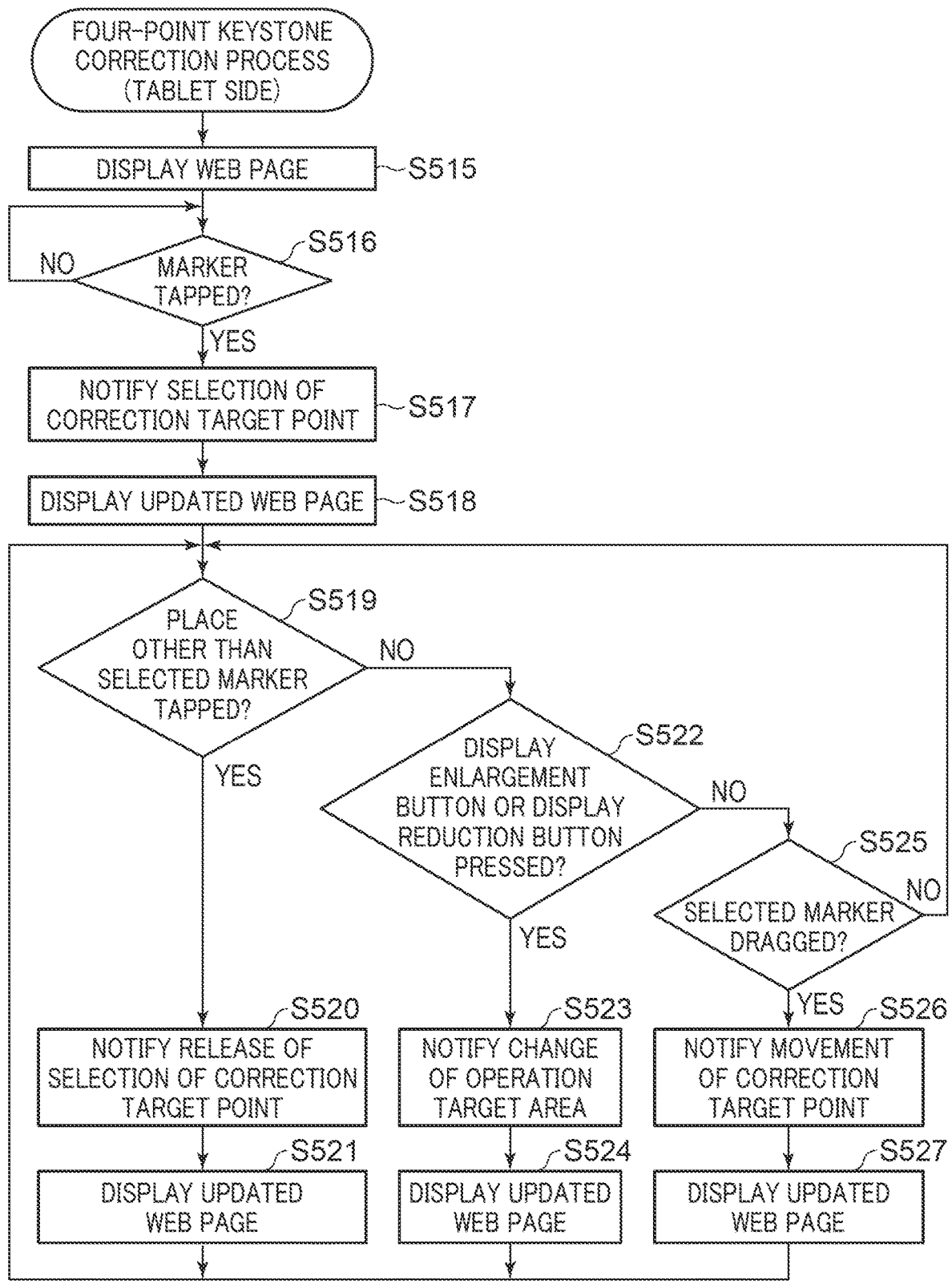
FIG. 5B is a flowchart of a four-point keystone correction process performed by a CPU of the tablet.

FIG. 5B is a flowchart of a four-point keystone correction process performed by the CPU 204 of the tablet 200. The present process is performed by the CPU 204 that controls the function blocks of the tablet 200 based on a program stored in the ROM 205.

The four-point keystone correction process in FIG. 5B is started when the user accesses the predetermined URL for four-point keystone adjustment of the projector 100, using the operation section 203 of the tablet 200. Further, similar to the description with reference to FIG. 5A, the description is given with reference to FIG. 5B assuming that then upper right point of the projection image to be projected on the projection plane has been selected as the correction target point on the tablet 200, and further, the selected correction target point has been moved inward.

When the four-point keystone correction process is started, the CPU 204 displays the Web page shown in FIG. 6A on the display section 202 of the tablet 200. More specifically, the rectangle corresponding to the outer trapezoid 606 appearing in FIG. 6B, indicative of the whole area of the projection plane of the projector 100, and the trapezoid corresponding to the inner trapezoid 605 appearing in FIG. 6B, after being subjected to four-point keystone correction, are displayed on the display section 202 (step S515).

Next, if the user has tapped one of the markers 611 to 614 appearing in FIG. 6A (YES to a step S516), the process proceeds to a step S517. In the step S517, the CPU 204 selects an end point on which the tapped marker is displayed (the upper right end point 602 in the present embodiment) as the correction target point to be corrected by the four-point keystone correction process, and notifies the projector 100 that the correction target point has been selected. At this time, the CPU 204 also notifies the projector 100 of the position information of the end point selected as the correction target point so as to cause the projector 100 to display a guide pattern indicative of a predetermined area including the correction target point in a state superimposed on the video, on the projection plane, in the step S504.

In a step S518, the CPU 204 displays the Web page updated in the step S504. More specifically, as shown in FIG. 6C, the shape pattern 607 is displayed in the operation target area including the end point 602 selected as the correction target point.

After that, if the user has tapped a place other than the selected marker (the marker 612 at the upper right end point 602 in the present embodiment) (YES to a step S519), the CPU 204 notifies the projector 100 that the correction target point is released from the selected state (step S520). After that, the CPU 204 displays the Web page updated in the step S514 (step S521), and then returns to the step S519.

On the other hand, if the user has pressed one of the display enlargement button 608 and the display reduction button 609 (NO to the step S519, and YES to a step S522), the CPU 204 notifies the projector 100 that the operation target area has been changed (step S523). More specifically, the CPU 204 notifies the projector 100 of information indicative of the type of the pressed button. Then, the CPU 204 proceeds to a step S524, displays the Web page updated in the step S511, and returns to the step S519.

Further, if the user has dragged selected marker (the marker 612 in the present example) (NO to the step S519, NO to the step S522, and YES to a step S525), the CPU 204 proceeds to a step S526. In the step S526, the CPU 204 moves the position of the selected marker based on the user's drag operation, and notifies the projector 100 that the correction target point has been moved. At this time, the CPU 204 also notifies the projector 100 of the position information of the moved correction target point so as to cause the projector 100 to perform four-point keystone correction in the step S508. After that, the CPU 204 proceeds to a step S527 to display the Web page updated in the step S509, and then returns to the step S519.

According to the present process, as shown in FIGS. 6C and 6D, the shape pattern 607 is displayed in the operation target area around the end point 602 as the correction target point on both of the display section 202 of the tablet 200 and the projection plane on which the video is projected from the projector 100. This enables, when performing keystone correction, the user to accurately move the correction target point by operating the operation terminal.

However, in a case where the whole projection plane is the operation target area, fine movement of the correction target point on the display section 202 of the tablet 200 is converted to large movement of the correction target point on the projection plane. Here, as shown in FIGS. 6E to 6H, while the operation target area on the projection plane is reduced, only part of the video signal corresponding to the operation target area is displayed on the display section 202 of the tablet 200 in an enlarged state. This enables the user to finely move the correction target point on the projection plane e.g. by a drag operation on the display section 202 of the tablet 200, which can improve the operability. Further, a hatched area of the whole area of the projection plane, in which the video is not displayed, is included in the operation target area. This enables the user to grasp the moving direction of the correction target point when expanding the target area of keystone correction outward of the range of the projection image being currently displayed. Further, by displaying the shape pattern 607 in the operation target area including the correction target point, the position of the correction target point is made clear, and even in a case where the projection image being currently displayed is low in contrast, the user can accurately grasp the end point of the projection image, and perform finer correction. Although in the present embodiment, the shape pattern 607 in the form of a grid which equally divides each of the vertical and horizontal operation target ranges into four equal sections is displayed in the operation target area by way of example, a pattern other than the vertically and horizontally divided grid pattern may be used. For example, by drawing a concentric circle with the correction target point as the center, it is possible to make the user easily grasp a sense of distance, and further it is possible to obtain the same advantageous effects by changing not only the shape, but also the color.

Note that processing performed by the CPU 110 of the projector 100 in the four-point keystone correction process in FIG. 5A, other than processing for forming and displaying a projection image on the projection plane, may be performed by the CPU 204 of the tablet 200. In this case, the CPU 204 of the tablet 200 controls the display section 202 based on a user's operation received via the operation section 203 appearing in FIG. 1, to thereby display the Web pages shown in FIGS. 6A, 6C, 6E, and 6G. Further, the CPU 204 performs keystone correction on a video signal, and processing for updating the display form of the shape pattern 607, and so forth, based on a user's operation received via the operation section 203, and transmits the processing result to the projector 100 via the communication section 201. The CPU 110 of the projector 100 causes the image processor 140 to form a projection image from a video signal based on the processing result received via the communication section 193, and controls the liquid crystal controller 150 to display the formed projection image on the projection plane.

As described heretofore, it is possible to realize four-point keystone correction by causing a user to drag the end point 602 selected as the correction target point within the operation target area on the display section 202 of the tablet 200. Further, it is also possible to improve the operability by displaying the operation target area on the display section 202 of the tablet 200 in an enlarged state, as shown in FIGS. 6E and 6G. However, there are cases where a user cannot move the correction target point to a desired position due to hand shake, and where a contact surface is increased due to the operation using his/her finger, and hence it is expected that it is impossible to perforce precise movement of the correction target point.

Figure 7A:
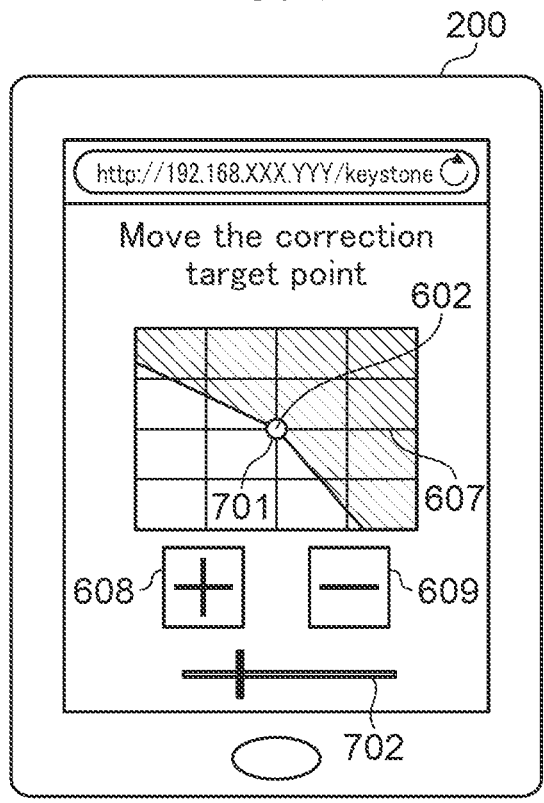
FIGS. 7A to 7D are diagrams showing variations of states of the operation screen of the tablet and the projection plane of the projector.
Figure 7B:
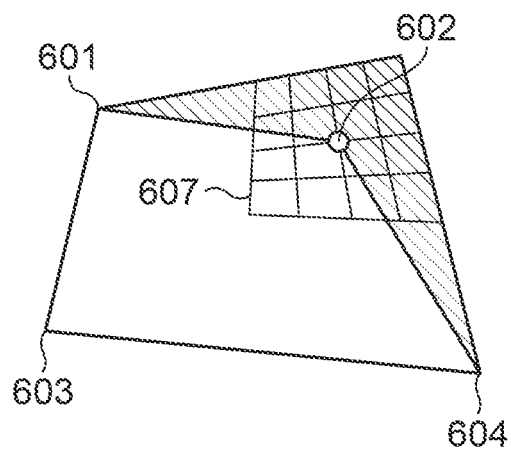

To overcome such a problem, as shown in FIG. 7A, the position of the operation target area may be set by the operation target area superimposition section 144 of the projector 100 such that the end point 602 selected as the correction target point coincides with one of grid points of the shape pattern 607. For example, in a case where the user taps a grid point (denoted by 701 in FIG. 7A) which is at the center of the operation target area on the screen of the display section 202 of the tablet 200 shown in FIG. 6E, the end point 602 as the correction target point may be moved as shown in FIG. 7A. In this case, a projection image as shown in FIG. 7B is projected on the projection plane of the projector 100. A slide bar 702 is provided for the sake of explanation, given hereinafter. Not that the shape pattern 607 is not limited to the grid pattern shown in the present embodiment, but may be a guide pattern which has a plurality of feature points recognizable by a use and is displayed in the operation target area.

Further, the lower part of the Web page may have not only the display enlargement button 608 and the display reduction button 609 appearing in FIGS. 6C, 6E, and 6G, but also the slide bar 702 for changing the number of feature points of the shape pattern 607 as shown in FIG. 7A. Instead of arranging the slide bar 702, the function of the slide bar 702 may be expressed by using a button, as in the case of the display enlargement button 608 and the display reduction button 609 in the present embodiment.

Figure 7C:
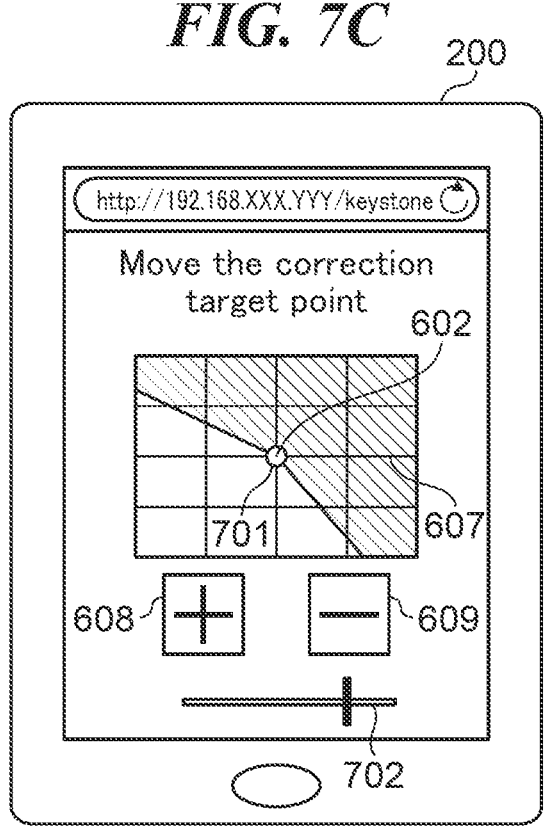
Figure 7D:
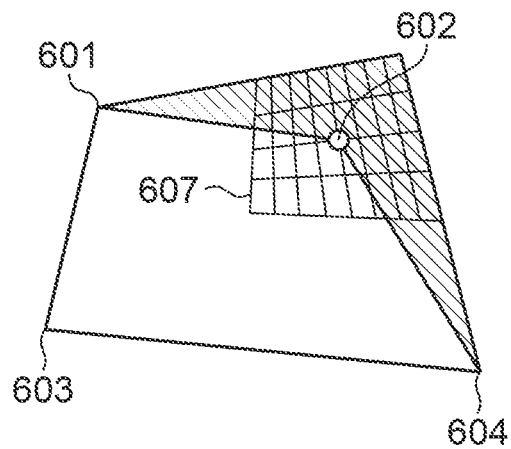

Further, although in FIGS. 6A to 6H, both the vertical and horizontal ranges of the operation target area are divided into four sections by the shape pattern 607, the dividing method is not limited to this method of dividing each of the vertical and horizontal operation target ranges into the same number of sections. For example, as shown in FIGS. 7C and 7D, the number of areas into which the operation target area is divided by the shape pattern 607 may be increased or reduced by operating the slide bar 702 e.g. such that that the number of sections into which a horizontal range is divided is set to eight, and that the number of sections into which a vertical range is divided is set to 4. The number of feature points of the shape pattern 607, which is changed by the slide bar 702, may not be set depending on the number of divided areas in the present embodiment, but may be set to a desired number. The shape pattern 607 is not limited to the grid pattern used in the present embodiment, but may be a pattern formed by a plurality of concentric circles with the correction target point as the center. However, in this case as well, the feature points to which the correction target point can be moved are at respective locations associated with pixels of the projection image. Further, the slide bar 702 may be provided in plurality, and how the pattern is changed is not limited to the illustrated examples of the present embodiment.

Further, although in the present embodiment, the operation target area is displayed on the projection plane when four-point keystone correction is performed, how a user's operation is performed may be determined, and the operation target area may not be displayed depending on a result of the determination. For example, there is a case where when a user controls the projector 100 according to a control command provided via a network, the user does not wish to display unnecessary information on the projection plane. For this reason, the projector 100 may be controlled to display the operation target area in a case where a user adjusts the position of the correction target point by visually checking the same using e.g. the tablet 200 as in the case of the present embodiment, and not to display the operation target area in a case where a user uses a control command via a network. Further, the configuration may be such that whether or not to display the operation target area can be switched by a user's operation performed on the operation section 203 of the tablet 200.

Although in the present embodiment, the projector 100 controls the tablet 200 by displaying the Web page transmitted from the Web server within the projector 100, on the tablet 200, this is not limitative. For example, the tablet 200 may control the projector 100 by installing a dedicated application in the tablet 200. Further, although in the present embodiment, the Web page of the tablet 200 is updated from the Web server of the projector 100, the Web page may be updated by the tablet 200. That is, the Web page may be updated on the Web browser of the tablet 200 using a technique, such as HTML5, and only a result of four-point keystone correction processing may be transmitted to the Web server of the projector 100. When the technique of HMLT5 is used, the Web page is updated on the tablet 200, and hence it is possible to obtain an effect of reducing communication with the projector 100. Further, since the Web page is updated on the Web browser of the tablet 200, it is possible to obtain an effect of improving the response to a user's touch operation.

As described above, according to the present embodiment, when performing four-point keystone correction, the operation screen displayed on the display section 202 of the tablet 200 and the projection image projected on the projection plane are associated with each other. This enables the user to accurately move the correction target point by operating the tablet 200.

Next, a description will be Liven of a four-point keystone correction process performed by the CPU 110 of the projector 100 in the system including the tablet 200 as the control device according to a second embodiment of the present invention with reference to FIGS. 8 to 11.

Note that the hardware configuration of the present embodiment is the same as that of the first embodiment except a point that the operation target area superimposition section 144 of the image processor 140 of the projector 100 shown in FIG. 4 is changed to a moving direction guide superimposition section 144a. Therefore, the same component elements as those of the first embodiment are denoted by the same reference numerals, and description thereof is omitted. The following description of the present embodiment is given assuming that the operation target area superimposition section 144 in FIG. 4 is replaced by the moving direction guide superimposition section 144a, and reference numeral 144a is not shown.

Figure 8:
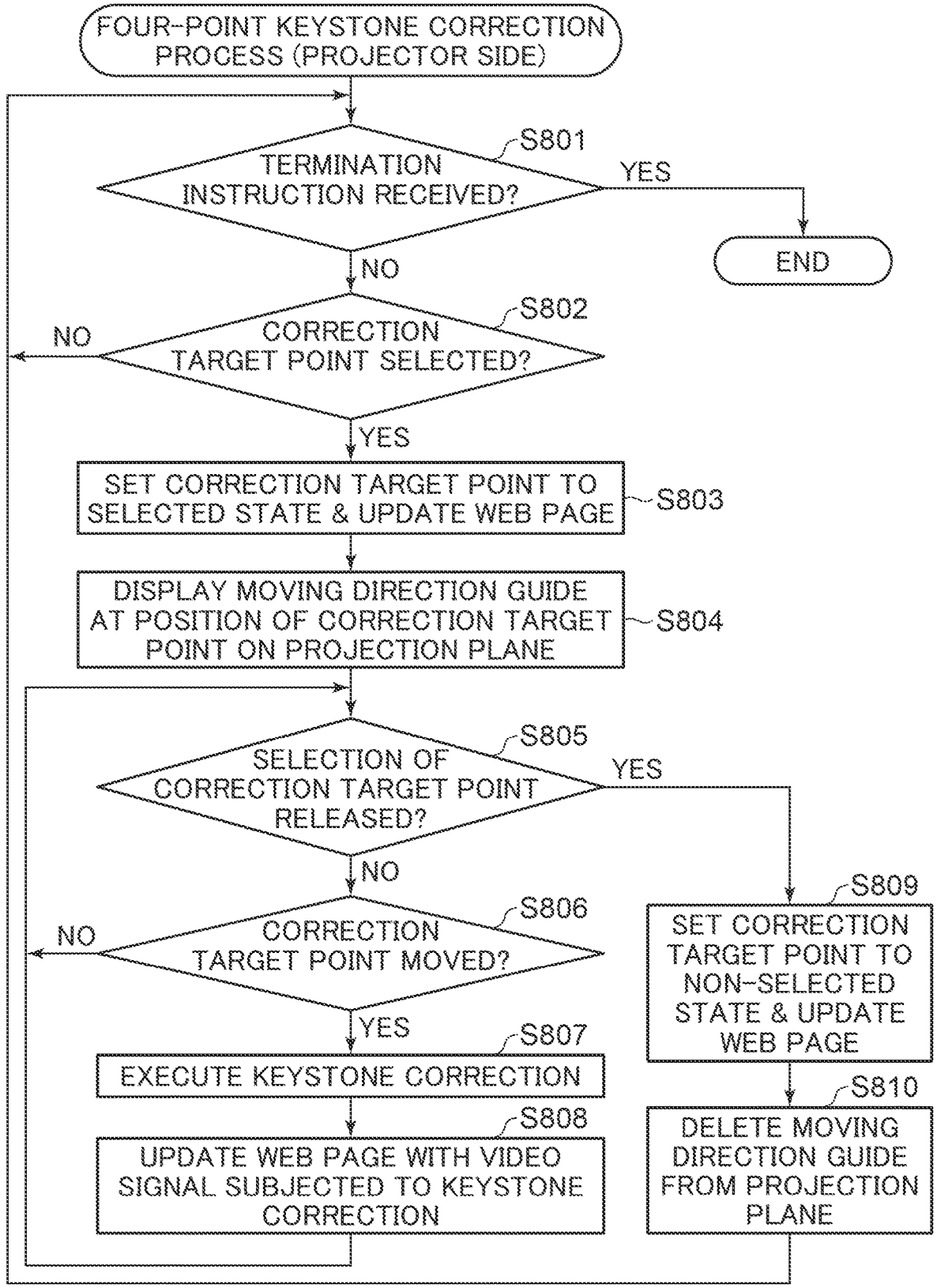
FIG. 8 is a flowchart of a four-point keystone correction process performed by a CPU of a projector of a system including a tablet as a control device according to a second embodiment.

FIG. 8 is a flowchart of the four-point keystone correction process according to the present embodiment, performed by the CPU 110 of the projector 100. Note that the four-point keystone correction process according to the present embodiment, performed by the CPU 204 of the tablet 200, is the same as that of the first embodiment except a point that a guide pattern displayed on the display section 202 is different, and enlargement and reduction of the operation target area are not performed.

Figure 9A:
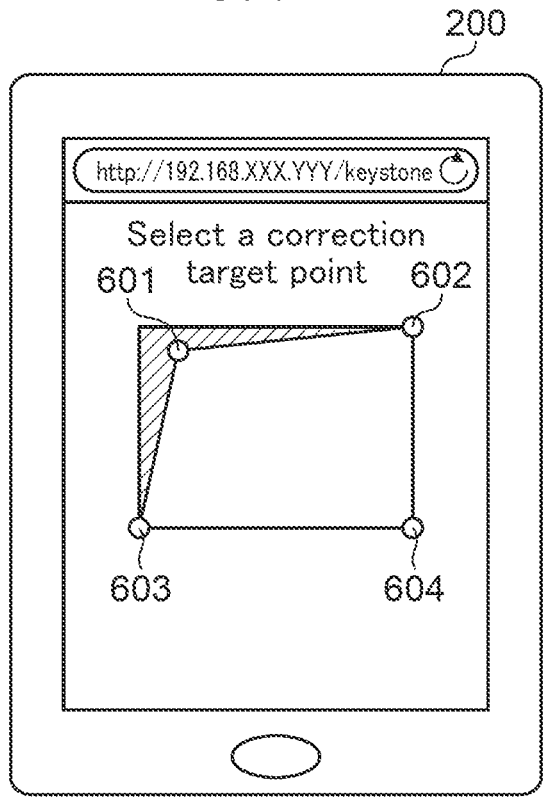
FIGS. 9A to 9F are diagrams showing states of an operation screen of the tablet according to the second embodiment and a projection plane of the projector.
Figure 9B:
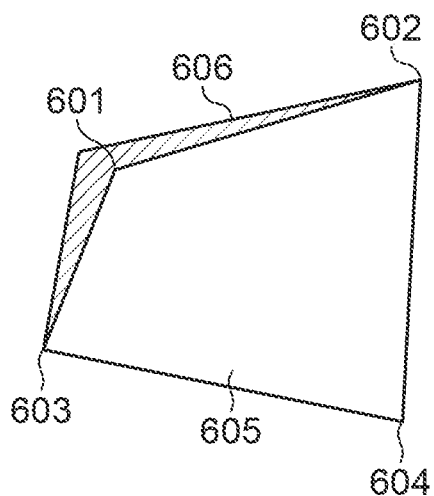

The four-point keystone correction process in FIG. 8 is started when a user accesses a predetermined URL for four-point keystone adjustment of the projector 100 using the tablet 200. When the above-mentioned access is made, such a Web page as shown in FIG. 9A is displayed on the display section 202 of the tablet 200. Note that the explanation of the four-point keystone correction process in FIG. 8 is given assuming that an upper left point of a projection image to be projected on the projection plane has already been selected as a correction target point, referred to hereinafter, on the tablet 200, and further, the correction target point has been moved inward. That is, such a projection image as shown in FIG. 9B is projected on the projection plane of the projector 100 at the start of the present explanation. Referring to FIG. 9B, the outer trapezoid 606 represents a range indicative of the whole area of the projection plane of the projector 100, and the trapezoid 605 inside the trapezoid 606 represents a range of a projection image after being subjected to four-point keystone correction. A hatched area between the outer trapezoid 606 and the inner trapezoid 605 is an area in which a video ceases to be displayed as a result of four-point keystone correction.

When the four-point keystone correction process is started, the CPU 110 acquires information received via the operation section 113, and determines whether or not a termination instruction has been provided by a user (step S801). The termination instruction refers to an operation of powering off the projector 100, or an operation of turning off the network function. If the termination instruction has been provided, the CPU 110 terminates the Web serve within the projector 100, followed by terminating the present process.

Next, the CPU 110 determines via the communication section 193 whether or not a correction target point has been selected on the tablet 200 (step S802). Note that the correction target point refers to an end point at any of four corners of the area of the projection image on which four-point keystone correction is to be performed, and refers to any of end points 601 to 604 in FIGS. 9A and 9B. In a case where the user taps (selects) one of the end points 601 to 604 on the display section 202 of the tablet 200, it is determined that the correction target point is selected. If it is determined in the step S802 that the correction target point has not been selected, the CPU 110 returns to the step S801, and monitors again whether or not the terminal instruction has been provided. If it is determined in the step S802 that the correction target point has been selected, the CPU 110 updates the Web page displayed on the tablet 200 via the communication section 193, and displays the end point in a selected state (step S803).

Figure 9C:
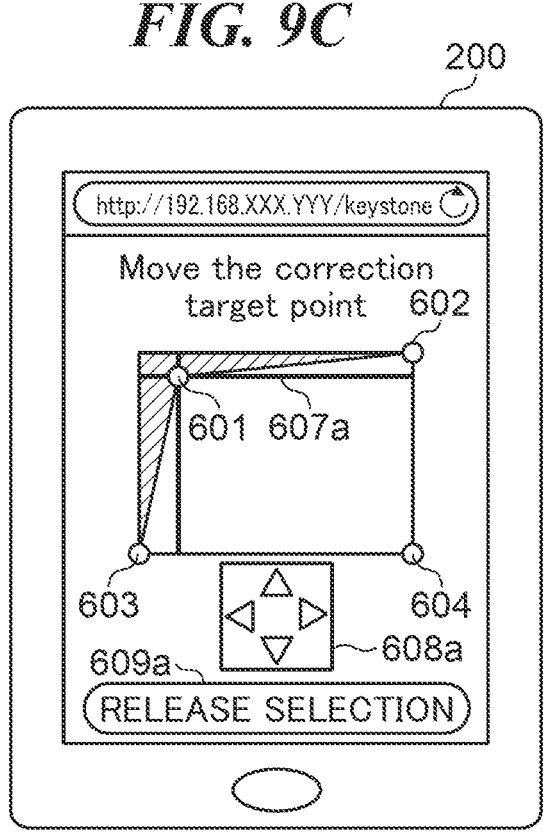

FIG. 9C shows an example of the updated Web page. FIG. 9C shows a state a state of display on the display section 202 of the tablet 200, in which the upper left end point 601 has been selected as the correction target point. Referring to FIG. 9C, to indicate the fact that the end point 601 has been selected as the correction target point, the color of the end point 601 is changed. Further, to indicate that the correction target point can be moved within the whole area of the projection plane as the operation target area including the correction target point, a cross pattern 607a having the end point 601 at the intersection thereof is displayed. Here, the cross pattern 607a is a guide pattern indicative of the horizontal and vertical directions with respect to the coordinate system of the plane of the liquid crystal panel 151. Further, a cross key 608a for finely adjusting the position of the correction target point by vertically and horizontally moving the end point 601 as the correction target point by a predetermined movement amount and a selection cancel button 609a for releasing the end point 601 from the state selected as the correction target point are displayed in the lower part of the Web page. Note that the screen shown in FIG. 9C is used by way of example, but any other suitable expression may be used insofar as it can indicate the state in which the end point 601 has been selected as the correction target point. For example, the size and the shape of the end point 601 may be changed when it is selected as the correction target point. Further, although in the present embodiment, the operation target area is always the whole area of the projection plane, the operation target area may be enlarged or reduced similar to the first embodiment.

Figure 9D:
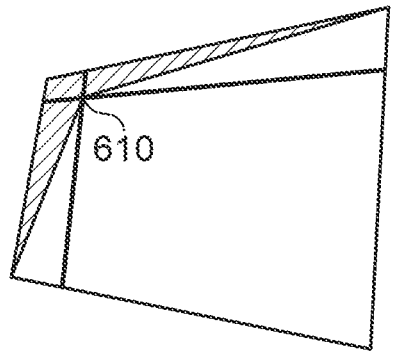

Next, the CPU 110 instructs the moving direction guide superimposition section 144a to superimpose a moving direction guide on the projection plane as a guide pattern (step S804). FIG. 9D shows an example of the moving direction guide displayed on the projection plane in this case. Referring to FIG. 9D, the moving direction guide, denoted by reference numeral 610, is expressed by solid crossing lines indicative of the horizontal and vertical directions with respect to the coordinate system of the plane of the liquid crystal panel 151, which have the end point 601 as the correction target point at the intersection thereof. Further, the moving direction guide 610 is displayed over the hatched area in which the video is not displayed as a result of four-point keystone correction.

Figure 12A:
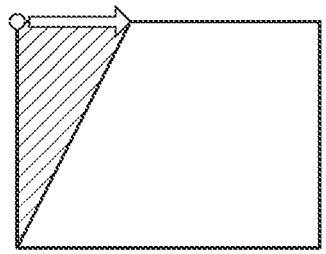
FIGS. 12A and 12B are diagrams useful in explaining deviation between the moving direction of a correction target point on the tablet and the moving direction of the correction target point on the projection plane in a case where the projector projects an image obliquely with respect to the projection plane in related art.
Figure 12B:
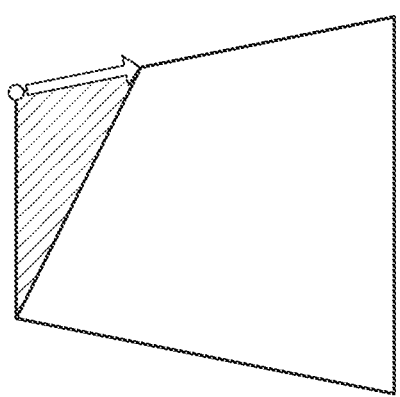

A user's operation on the operation screen of the tablet 200 is performed with respect to the coordinate system of the plane of the liquid crystal panel 151. On the other hand, as shown in FIGS. 12A and 12B, in a case where the projector 100 projects an image obliquely to the screen, not shown, the moving direction of the correction target point on the projection plane deviates from the moving direction of the correction target point on the plane on the liquid crystal panel 151.

To overcome this problem, in FIG. 9C, the moving direction guide 610 indicative of the horizontal and vertical directions is displayed around the end point 601 selected as the correction target point in a manner associated with both of the display section 202 of the tablet 200 and the projection plane. By performing this display, the user is enabled to intuitively grasp how the movement of the correction target point in the vertical and horizontal directions on the display section 202 of the table 200 appears on the projection plane, which improves the operability. Further, the moving direction guide 610 is also displayed in the hatched area out of the whole area of the projection plane, in which a video is not displayed. This enables the user to grasp the moving direction of the correction target point even when expanding the keystone correction target area outside the range of the projection image being currently displayed. Further, the cross pattern 607a is displayed with the correction target point at the intersection thereof, whereby the position of the correction target point is made clear, and even when the projection image being currently displayed is low in contrast, the user is enabled to accurately grasp the end point of the projection image, and perform finer correction. Although in the present embodiment, the moving direction guide provides guides in the vertical and horizontal directions, by way of example, a moving direction other than the vertical and horizontal directions may be displayed. For example, by presenting the four directions of upper right, lower right, lower left, and upper left directions, and the four directions of the vertical directions and horizontal directions, a total eight directions may be indicated. Further, although in the present embodiment, the cross-shaped moving direction guide 610 having the end point 601 selected as the correction target point at the intersection thereof is displayed, the moving direction may be displayed by using another displaying method, such as a method using an arrow.

Next, the CPU 110 determines via the communication section 193 whether or not the correction target point has been released from the selected state on the tablet 200 (step S805). The correction target point is released from the selected state e.g. by pressing the selection cancel button 609a appearing in FIG. 9C. Although in the present embodiment, the dedicated button is provided to cancel the selected state, the dedicated button is not necessarily required. For example, the correction target point may be released from the selected state by tapping a place on the display section 202 of the tablet 200, other than the end point 601 selected as the correction target point.

If it is determined in the step S805 that the correction target point has been released from the selected state, the CPU 110 sets the correction target point in the non-selected state, and updates the Web page (step S809). After that, the CPU 110 instructs the moving direction guide superimposition section 144a to delete the moving direction guide 610 from the projection plane (step S810), and returns to the step S801 to continue the present process. By executing the steps S809 and S810, the display section 202 of the tablet 200 returns to the state shown in FIG. 9A, and the projection plane returns to the state shown in FIG. 9B, i.e. the state in which the moving direction guide 610 is not displayed.

If it is determined in the step S805 that the correction target point has not been released from the selected state, the CPU 110 determines via the communication section 193 whether or not the correction target point has been moved on the tablet 200 (step S806). The correction target point is moved e.g. by an operation of dragging the end point 601 as the correction target point, or an operation of pressing the cross key 608a on the display section 202 of the tablet 200.

If it is determined in the step S806 that the correction target point has not been moved, the CPU 110 returns to the step S805 to continue the present process. On the other hand, if it is determined in the step S806 that the correction target point has been moved, the CPU 110 proceeds to a step S807.

In the step S807, the CPU 110 causes the keystone correction section 143 to perform four-point keystone correction on the video signal using the position information of the moved correction target point as a modification parameter for keystone correction. Next, the CPU 110 updates the Web page displayed on the display section 202 of the tablet 200 based on the keystone correction information via the communication section 193 (step S808), then returns to the step S805 to continue the present process.

Figure 9E:
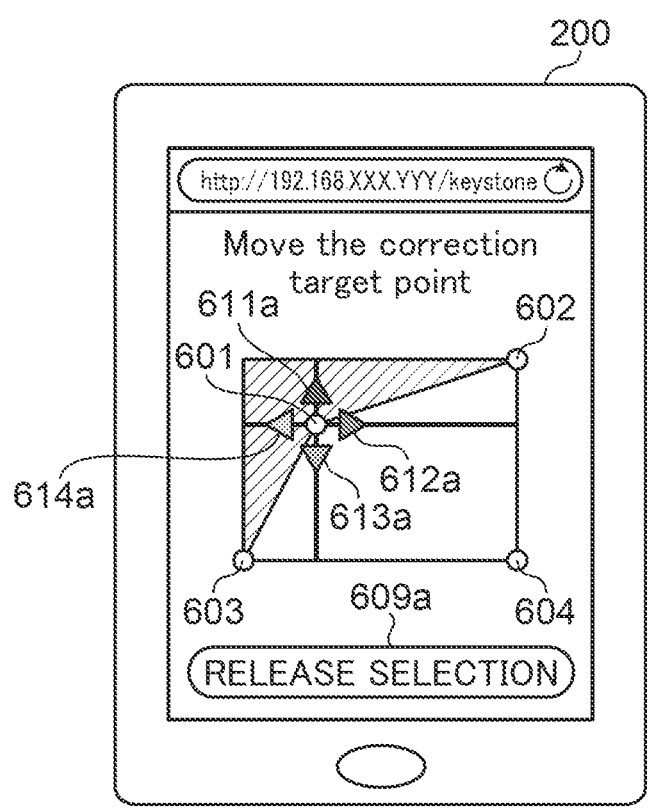
Figure 9F:
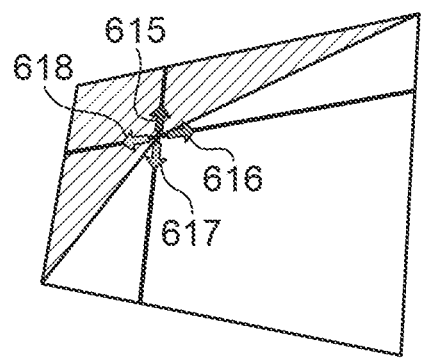

Although in FIG. 9C, the cross key 608a for fine adjustment is provided on the lower part of the Web page, arrow buttons 611a to 614a for fine adjustment may be provided around the correction target point being currently selected as shown in FIG. 9E. Further, as shown in FIG. 9F, arrows 615 to 618 corresponding to the arrow buttons 611a to 614a, respectively, may be also displayed on the projection plane in a state superimposed on the moving direction guide 610. Further, at this time, different colors may be applied to the arrow buttons 611a to 614a on the tablet 200, and the same colors may be applied to the colors of the arrows 615 to 618 on the projection plane, corresponding to the arrow buttons 611a to 614a, respectively. Thus, the display may be performed in a manner associating the arrow buttons 611a to 614a on the tablet 200 and the arrows 615 to 618 on the projection plane with each other. By doing this, it is possible to present, to the user, in which direction of the projection plane, a movement in one of the vertical and horizontal directions on the tablet 200 is reflected, which further improves the operability. Although in the above description, the arrow buttons 611a to 614a for fine adjustment and the arrows 615 to 618 indicative of the moving direction of the correction target point on the projection plane are associated with each other using the colors, the association may be effected by using shapes. Further, although in the present embodiment, the arrows 615 to 618 indicative of the moving directions of the correction target point are further displayed on the moving direction guide 610, and are associated with the arrow buttons 611a to 614a for fine adjustment, the association may be effected by using another method. For example, the line segments of the moving direction guide 610 represented by solid cross lines on the projection plane may be associated with those of the cross pattern 607a displayed around the correction target point on the tablet 200, by changing the colors of the line segments in association with the corresponding directions.

Although in FIGS. 9E and 9F, the description is given using the example in which the correction target point is inside the area of the liquid crystal panel 151 (hereinafter simply referred to as the "panel area"), this is not limitative. For example, in a case where the correction target point reaches the outer periphery of the panel area, an arrow button out of the arrow buttons 611a to 614a for fine adjustment, associated with a direction in which the correction target point cannot be moved, may be grayed out to thereby make a user aware that the grayed-out button is in an inoperable state. Further, in this case, when the correction target point reaches the outer periphery of the panel area, any of the arrows 615 to 618 on the projection plane, which are brought out of the panel area, is/are not shown.

For example, if the end point 602 which is an end point of the panel area is selected as the correction target point in the state shown in FIG. 9F, the correction target point cannot be moved in the right direction and the upper direction. In this case, the arrow buttons 611a and 612a for fine adjustment in the right and upper directions on the tablet 200 are grayed out, and only the arrow buttons 613a and 614a are made operable. Further, on the projection plane, the arrows 615 and 616 are outside the panel area, and hence the arrows 615 and 616 are not shown. Thus, by graying out an arrow button for fine adjustment, which indicates an inoperable direction, and showing operable directions to the user, the convenience of the user is improved.

Further, although in the above description, one of the end points at the four corners of the area of the projection image is set as the correction target point, one of end points at four corners of a video signal may be set as the correction target point. For example, in a case where the aspect ratio of the liquid crystal panel 151 of the projector 100 and the aspect ratio of a video signal input to the projector 100 do not coincide with each other, one of the end points at the four corners of the video signal may be made operable as the correction target point.

Figure 10A:
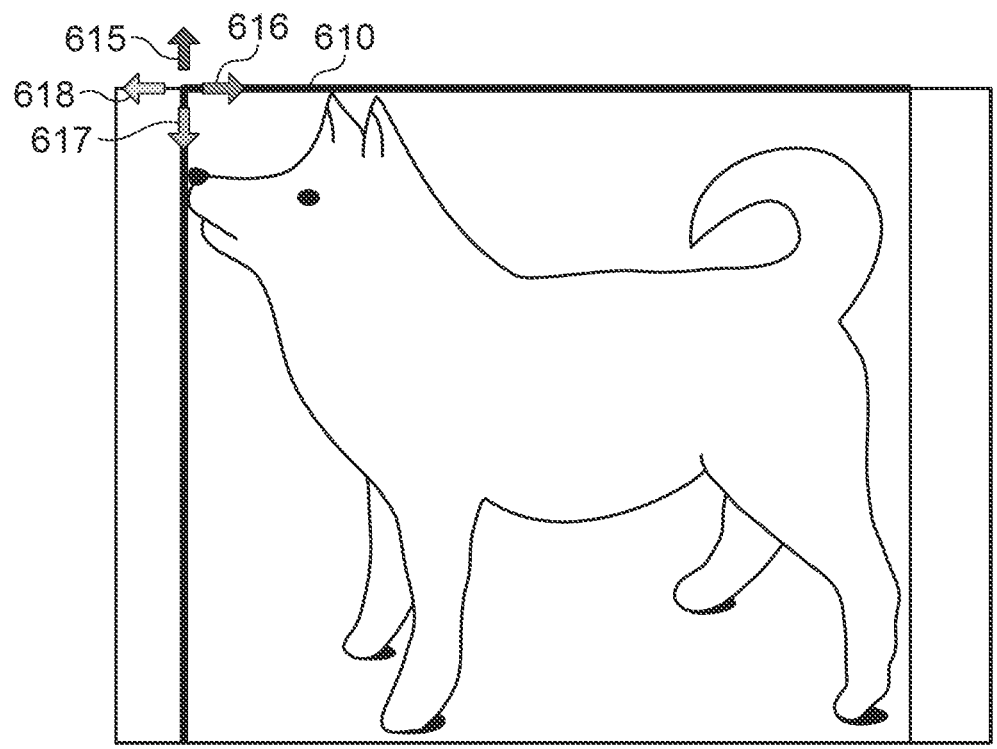
FIGS. 10A and 10B are diagrams showing a relationship between a video signal and a panel area in a case where the aspect ratio of a liquid crystal panel appearing in FIG. 2 and that of the video signal do not coincide with each other.
Figure 10B:
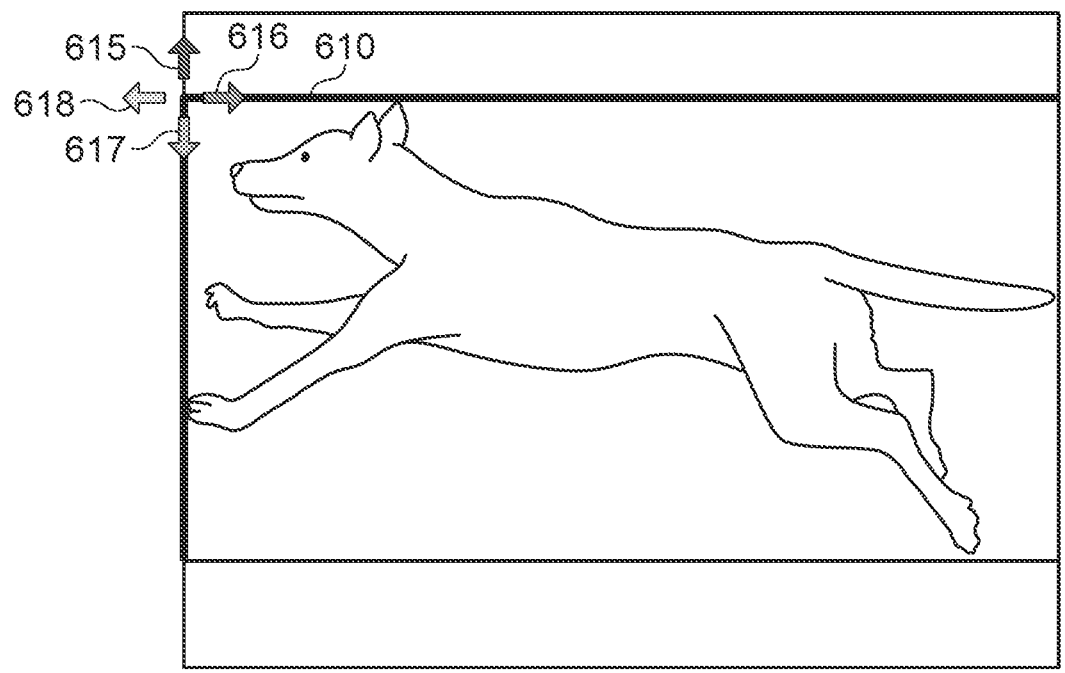

FIGS. 10A and 10B are diagrams showing a relationship between a video signal on the tablet 200 according to the present embodiment and a panel area in a case where the liquid crystal panel 151 and the video signal are different in aspect ratio.

The following description will be given of a case where an upper left corner of the video signal is selected as the correction target point on the operation screen of the tablet 200.

FIG. 10A shows a relationship between the video signal and the panel area in a case where the aspect ratio of the video signal is vertically longer than that of the liquid crystal panel 151. On the other hand, FIG. 10B shows a relationship between the video signal and the panel area in a case where the aspect ratio of the video signal is horizontally longer than that of the liquid crystal panel 151.

As shown in FIGS. 10A and 10B, in a case where one of four corners of the video signal is selected as the correction target point, the video signal includes the moving direction guide 610 including the selected correction target point, and the arrows 615 to 618 indicative of the moving directions of the correction target point. Note that FIGS. 10A and 10B each do not show the projection image itself displayed on the projection plane. In actuality, a range within a rectangular area indicative of the panel area of the video signal shown in each of FIGS. 10A and 10B is displayed on the projection plane as the projection image. That is, in the illustrated example in FIG. 10A, the arrow 615 is outside the panel area, and hence the arrow 615 is not included in the projection image displayed on the projection plane. Further, the respective upper half parts of the arrows 616 and 618 are also outside the panel area, and are not included in the projection image displayed on the projection plane. Similarly, in FIG. 10B, the arrow 618 is not included in the projection image displayed on the projection plane, and the respective left half parts of the arrows 615 and 617 are not included in the projection image displayed on the projection plane, either.

One of the end points of the video signal is selected as the correction target point as shown in FIGS. 10A and 10B, whereby when a user performs four-point keystone correction, it is possible to easily cause the four corners of the screen to coincide with the four corners of the video signal, respectively.

Further, although in the present embodiment, the moving direction guide 610 is displayed on the projection plane when performing four-point keystone correction, a method of a user's operation may be determined and the moving direction guide 610 may be controlled not to be displayed depending on a result of the determination. For example, there is a case where when a user controls the projector 100 using a control command via a network, the user does not desire to display unnecessary display on the projection plane. To cope with this, the moving direction guide 610 may be displayed in a case where a remote controller, the tablet 200 or the like is used by the user for adjusting the position of the correction target point, and may not be displayed in a case where a control command via a network is used. Further, the configuration may be such that a user may be allowed to switch between display and non-display of the moving direction guide 610.

Further, although in the present embodiment, the moving direction guide superimposition section 144a is included in the image processor 140, the OSD superimposition section 142 may be configured to draw the moving direction guide 610 without providing the moving direction guide superimposition section 144a. In this case, keystone modification cannot be performed on the video signal by the OSD superimposition section 142, and hence the OSD superimposition section 142 simulates drawing of a state in which keystone modification is performed. That is, the display is performed not such that the video signal itself is modified into a trapezoid, but such that some test pattern for expressing the image area indicated by the video signal is modified into a trapezoid.

The following description will be given of processing for drawing the moving direction guide using the OSD superimposition section 142, according to the present embodiment with reference to FIG. 11.

FIGS. 11A to 11D are diagrams showing contents of the video signals sig302 to sig305, respectively, expressed when the moving direction guide 610 is displayed by the moving direction guide superimposition section 144a without using the OSD superimposition section 142.

In this case, since the OSD superimposition section 142 is not used, as shown in FIGS. 11A and 11B, the video signal sig302 input to the OSD superimposition section 142 and the video signal sig303 output from the OSD superimposition section 142 have the same contents. Next, when correction is performed on the video signal sig303 by the keystone correction section 143, the video signal sig303 is changed to an image indicated by the video signal sig304 on which keystone correction has been performed, as shown in FIG. 11C. Finally, drawing performed by the moving direction guide superimposition section 144a is superimposed on the video signal sig304, whereby the output video signal sig305 as shown in FIG. 1 ID is obtained.

FIGS. 11E to 11G are diagrams showing contents of the video signals sig302 to sig304, respectively, expressed when the moving direction guide 610 is displayed by the OSD superimposition section 142. FIG. 11H is a diagram showing a test pattern in which a grid pattern is added to the same area as the image area indicated by the video signal before the image area is modified into a trapezoid by the OSD superimposition section 142.

In a case where the same processing is performed by the OSD superimposition section 142, when it is determined in the step S806 in FIG. 8 that the correction target point has been moved, the keystone correction function of the keystone correction section 143 is disabled. Since the processing of the keystone correction section 143 is disabled, the video signal sig303 input to the keystone correction section 143 and the video signal sig304 output from the keystone correction section 143 have the same contents, as shown in FIGS. 11F and 11G.

Then, the OSD superimposition section 142 draws a trapezoid 801 as a pseudo expression of keystone modification as shown in FIG. 11F, and draws a moving direction guide 802 drawn as crossing lines in FIG. 11F at the same time. The trapezoid 801 is a figure obtained by keystone modification of the test pattern shown in FIG. 11H by the CPU 110. Specifically, the CPU 110 performs projection conversion with respect to the coordinates of each vertex of the grid of the test pattern shown in FIG. 11H, plots the converted vertexes on the RAM 112, and then obtains the trapezoid 801 by drawing line segments between the vertexes. After that, the CPU 110 draws an area other than the trapezoid 801, which is expressed by a hatched area in FIG. 11F, with an arbitrary color, and draws the moving direction guide 802. Then, the CPU 110 instructs the OSD superimposition section 142 to display the image existing on the RAM 112 on the projection plane. The CPU 110 controls the display as described above because if the number of vertexes is comparable to that shown in FIG. 11H, the CPU 110 can calculate a result of keystone modification within a short time. Further, by performing this display, it is possible to perform pseudo keystone modification of a video signal itself without being provided with dedicated hardware, and hence it is possible to reduce the costs of the apparatus. Note that the projector 100 may be configured to perform keystone correction on the video signal sig302 itself by using dedicated hardware or a CPU having high performance, and display the corrected image. Further, by displaying the moving direction guide 802 using the OSD superimposition section 142, the hardware of the moving direction guide superimposition section 144a can be dispensed with, which makes it possible to reduce the costs of the apparatus. FIGS. 11E to 11G show the states in which the correction target point of four-point keystone correction is moved by a user. That is, after movement of the correction target point by the user is completed, the keystone correction section 143 is enabled, whereby four-point keystone correction is performed by the CPU 110 based on the moved correction target point. Therefore, upon completion of moving of the correction target point by the user, the video signal output from the image processor 140 is changed from the video signal sig304 shown in FIG. 11G to the video signal sig304 shown in FIG. 11C.

Although in the present embodiment, the Web page of the projector 100 is displayed on the tablet 200, and the control is performed from the Web page of the projector 100, this is not limitative. For example, the projector 100 may be controlled by installing a dedicated application in the tablet 200. Further, although in the present embodiment, the Web page of the tablet 200 is updated from the Web server of the projector 100, the Web page may be drawn and updated by the tablet 200. More specifically, the drawing data may be updated on the Web browser of the tablet 200 by using a technique, such as HTML5, and only a parameter for four-point keystone correction may be transmitted to the Web server of the projector 100. When the technique of HTML5 is used, the Web page is drawn and updated by the tablet 200, and hence it is possible to obtain an advantageous effect of reducing communication with the projector 100. Further, by drawing and updating the Web page on the Web browser of the tablet 200, it is possible to obtain an advantageous effect of improving the response to a user's touch operation.

As described above, according to the present embodiment, the guide indicative of moving directions is displayed when performing four-point keystone correction, whereby it is possible to make it easy for a user to perform finer correction.

Note that although in the first and second embodiments, a user's operation on the operation screen of the tablet 200 is performed with respect to the coordinate system of the plane of the liquid crystal panel 151, the operation may be performed with respect to the coordinate system of the projection plane.

In this case, when a user accesses a predetermined URL for four-point keystone adjustment for the projector 100 using the tablet 200, first, a Web page for instructing image capturing is displayed on the operation screen of the tablet 200. More specifically, on this Web page, the user is prompted to capture an image of the projection plane by holding the tablet 200 in a position in front of the screen.

When the image capturing operation is performed by the user according to the prompt for image capturing, the tablet 200 acquires the coordinate system of the plane of the liquid crystal panel 151 from the projector 100, and performs calibration of the acquired coordinate system and the coordinate system of the image acquired through image capturing.

The video displayed on the Web page shown in FIG. 6A is made identical to the video shown in FIG. 6B based on a result of this calibration.

Figure 13:
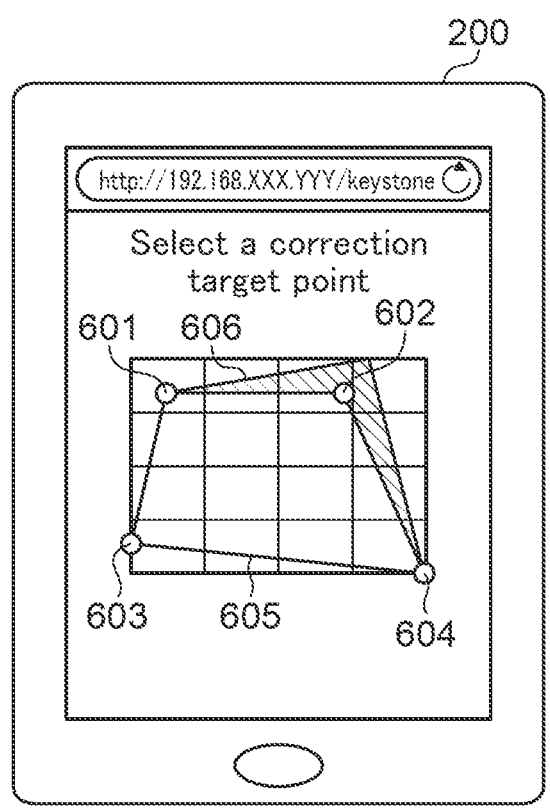
FIG. 13 is a diagram showing a variation of states of the operation screen of the tablet as the control device according to the first embodiment and the projection plane of the projector.

Further, at this time, such a grid shape pattern as shown in FIG. 13, having lines which divide the vertical and horizontal ranges of the operation screen of the tablet 200 into four sections may be displayed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-006087 filed Jan. 18, 2018, which is hereby incorporated by reference herein in its entirety.

What is claimed is:

1. A control device for controlling a projector, the control device comprising:
at least one processor and/or at least one circuit configured to:
select a target point of a projection image projected on a projection plane by the projector;
display, on a display that is different from the projection plane, an image indicative of the target point and a first area image indicative of a range in which the target point can be moved on the display;
control the projector to project a second area image on the projection plane, wherein the second area image indicates a range in which the target point can be moved on the projection plane;
receive a user's operation for moving the target point of the projection image; and
according to receipt of the user's operation, control the projector to move the target point on the projection plane,
wherein after selection of the target point and before reception of the user's operation for moving the target point, the at least one processor and/or at least one circuit displays the image and the first area image on the display and controls the projector to project the second area image on the projection plane, and
wherein the second area image includes a grid pattern indicative of the range in which the target point can be moved on the projection plane.

2. The control device according to claim 1, wherein the display includes a touch panel which can acquire information indicative of a position where a user has touched, and
wherein the user's operation is a drag operation for moving the image indicative of the target point displayed on the display.

3. The control device according to claim 1, wherein the at least one processor and/or at least one circuit is further configured to: according to receipt of a user's operation for changing the range in which the target point can be moved on the display, control the projector to project a third area image corresponding to the changed range.

4. The control device according to claim 1, wherein the at least one processor and/or at least one circuit is further configured to control the projector, in a case where selection of the target point is released, to release the selection of the target point.

5. The control device according to claim 1, wherein the at least one processor and/or at least one circuit controls the projector to move the target point on the projection plane by transmitting information indicative of a position of the target point.

6. A projection system including a projector, and a control device that controls the projector by communicating with the projector,
the projector comprising:
a light source and a projection optical system configured to project a projection image;
at least one processor and/or at least one circuit configured to:
correct a shape of the projection image by moving a position of a target point of a first image according to an instruction; and
control the projection optical system so as to project an image which is based on the first image and is corrected in shape, on a projection plane,
the control device comprising:
a display including a touch panel;
at least one processor and/or at least one circuit configured to:
select a target point of the projection image projected by the projector, according to a user's operation performed on the touch panel;
display an image on the display, the image including an image indicative of the target point and a first pattern image indicative of a range in which the target point can be moved on the display;
control the projector to project a second pattern image on the projection plane, wherein the second pattern image indicates a range in which the target point can be moved on the projection plane;
receive a user's operation for moving the target point of the projection image, according to a user's operation performed on the touch panel; and
transmit a first instruction indicative of the target point, to the projector,
wherein according to acquisition of the first instruction from the control device by the projector, the projector projects an image including the second pattern image, associated with the selected target point, and the first image corrected in shape, on the projection plane,
wherein according to receipt of the user's operation by the control device, the at least one processor and/or at least one circuit of the control device transmits a second instruction for moving the target point of the projection image, to the projector, and
wherein according to acquisition of the second instruction from the control device by the projector, the at least one processor and/or at least one circuit of the projector performs shape correction processing for moving the target point,
wherein after selection of the target point and before reception of the user's operation for moving the target point, the at least one processor and/or at least one circuit of the control device displays the image and the first pattern image on the display and controls the projector to project the second pattern image on the projection plane, and
wherein the second pattern image includes a grid pattern indicative of the range in which the target point can be moved on the projection plane.

7. A method of controlling a projector projecting a projection image projected on a projection plane, the method comprising:
selecting a target point of the projection image projected on the projection plane by the projector;
displaying, on a display that is different from the projection plane, an image indicative of the target point and a first area image indicative of a range in which the target point can be moved on the display;

controlling the projector to project a second area image on the projection plane, wherein the second area image indicates a range in which the target point can be moved on the projection plane;

receiving a user's operation for moving the target point of the projection image; and controlling the projector to move the target point on the projection plane according to receipt of the user's operation, wherein after selection of the target point and before reception of the user's operation for moving the target point, the image and the first area image are displayed on the display and the projector is controlled to project the second area image on the projection plane, and wherein the second area image includes a grid pattern indicative of the range in which the target point can be moved on the projection plane.

8. The method according to claim 7, wherein the display includes a touch panel which can acquire information indicative of a position where a user has touched, and wherein said receiving the user's operation includes receiving a drag operation for moving the image indicative of the target point displayed on the display as the user's operation for moving the target point.

9. The method according to claim 7, further comprising: according to receipt of a user's operation for changing a range in which the target point can be moved on the display, controlling the projector to project a third area image corresponding to the changed range.

10. The method according to claim 7, further comprising: in a case where the selection of the target point is released, controlling the projector to release the selection of the target point.

11. The method according to claim 7, wherein in the controlling the projector to move the target point, information indicative of a position of the selected target point is transmitted to the projector.

12. A method of controlling a projection system including a projector provided with a light source and a projection optical system, and a control device provided with a display including a touch panel, for controlling the projector by communicating with the projector, the method comprising:
causing the projector to
correct a shape of a projection image projected by the projector, by moving the position of a target point of a first image according to an instruction;
project an image which is based on the first image and is corrected in shape, on a projection plane;
causing the control device to
select a target point of the projection image projected by the projector, according to a user's operation performed on the touch panel;
display an image on the display, the image including an image indicative of the target point and a first pattern indicative of a range in which the target point can be moved on the display;
control the projector to project a second pattern image on the projection plane, wherein the second pattern image indicates a range in which the target point can be moved on the projection plane;
receive a user's operation for moving the target point of the projection image according to a user's operation performed on the touch panel;
transmit a first instruction indicative of the target point to the projector;
causing the projector to
project an image including the second pattern image, associated with the selected target point, and the first image corrected in shape, on the projection plane, according to acquisition of the first instruction from the control device by the projector;
causing the control device to
transmit a second instruction for moving the target point of the projection image according to receipt of the user's operation by the control device, to the projector; and
causing the projector to
perform shape correction processing for moving the target point according to acquisition of the second instruction from the control device by the projector, wherein after selection of the target point and before reception of the user's operation for moving the target point, the control device displays the image and the first pattern image on the display and controls the projector to project the second pattern image on the projection plane, and wherein the second pattern image includes a grid pattern indicative of the range in which the target point can be moved on the projection plane.

13. A non-transitory computer-readable storage medium storing a computer-executable program for executing a method of controlling a projector projecting a projection image projected on a projection plane, wherein the method comprises:
selecting a target point of the projection image projected on the projection plane by the projector;
displaying, on a display that is different from the projection plane, an image indicative of the target point and a first area image indicative of a range in which the target point can be moved on the display;
controlling the projector to project a second area image on the projection plane, wherein the second area image indicates a range in which the target point can be moved on the projection plane;
receiving a user's operation for moving the target point of the projection image; and
controlling the projector to move the target point on the projection plane according to receipt of the user's operation, wherein after selection of the target point and before reception of the user's operation for moving the target point, the image and the first area image are displayed on the display and the projector is controlled to project the second area image on the projection plane, and wherein the second area image includes a grid pattern indicative of the range in which the target point can be moved on the projection plane.

14. A non-transitory computer-readable storage medium storing a computer-executable program for executing a method of controlling a projection system including a projector provided with a light source and a projection optical system, and a control device provided with a display including a touch panel, that controls the projector by communicating with the projector, wherein the method comprises:
causing the projector to
correct a shape of a projection image projected by the projector, by moving the position of a target point of a first image according to an instruction;
project an image which is based on the first image and is corrected in shape, on a projection plane;
causing the control device to select a target point of the projection image projected by the projector, according to a user's operation performed on the touch panel;

display an image on the display, the image including an image indicative of the target point and a first pattern indicative of a range in which the target point can be moved on the display;

control the projector to project a second pattern image on the projection plane, wherein the second pattern image indicates a range in which the target point can be moved on the projection plane;

receive a user's operation for moving the target point of the projection image according to a user's operation performed on the touch panel;

transmit a first instruction indicative of the target point to the projector;

causing the projector to project an image including the second pattern image, associated with the selected target point, and the first image corrected in shape, on the projection plane, according to acquisition of the first instruction from the control device by the projector;

causing the control device to transmit a second instruction for moving the target point of the projection image according to receipt of the user's operation by the control device, to the projector; and causing the projector to perform shape correction processing for moving the target point according to acquisition of the second instruction from the control device by the projector, wherein after selection of the target point and before reception of the user's operation for moving the target point, the control device displays the image and the first pattern image on the display and controls the projector to project the second pattern image on the projection plane, and wherein the second pattern image includes a grid pattern indicative of the range in which the target point can be moved on the projection plane.

* * * * *